United States Patent [19]

Madden et al.

[11] Patent Number: 4,502,213

[45] Date of Patent: Mar. 5, 1985

[54] APPARATUS FOR THE AUTOMATIC CLOSURE OF ELECTROCHEMICAL CELLS

[75] Inventors: James A. Madden; Kenneth C. LeDuc, both of Gainesville, Fla.

[73] Assignee: General Electric Company, Gainesville, Fla.

[21] Appl. No.: 289,996

[22] Filed: Aug. 4, 1981

Related U.S. Application Data

[63] Continuation-in-part of Ser. No. 271,235, Jun. 8, 1981, abandoned, which is a continuation of Ser. No. 55,978, Jul. 9, 1979, abandoned.

[51] Int. Cl.³ .............................................. B23P 19/00
[52] U.S. Cl. ...................................... 29/730; 29/564.1
[58] Field of Search ................. 29/730, 731, 743, 744, 29/33 B, 33 E, 564.1, 623.1; 228/58, 901, 49 R, 49 A, 48; 53/367, 262; 414/754, 757, 781, 783; 198/411, 416

[56] References Cited

U.S. PATENT DOCUMENTS

| 1,675,382 | 7/1928 | Reinhardt | 29/730 |
|---|---|---|---|
| 1,729,843 | 10/1929 | Reich | 29/730 |
| 1,780,139 | 10/1930 | Schmidt | 29/730 |
| 1,780,982 | 11/1930 | Schmidt | 29/730 |
| 1,899,114 | 2/1933 | Schmidt | 228/58 |
| 3,220,885 | 11/1965 | Udell et al. | 29/730 |
| 3,250,373 | 5/1966 | Yanoshita | 198/410 |
| 3,394,858 | 7/1968 | Pellerin | 228/58 |
| 3,408,788 | 11/1968 | Greck | 53/367 |
| 4,098,059 | 7/1978 | Chattillion | 53/367 |
| 4,196,511 | 4/1980 | Kolosov et al. | 29/730 |

Primary Examiner—Howard N. Goldberg
Assistant Examiner—P. W. Echols
Attorney, Agent, or Firm—Henry J. Policinski

[57] ABSTRACT

Apparatus for the automatic assembly and closure of rechargeable cells packaged in a cylindrical casing, wherein the cell casing, containing a coiled electrode assembly, is advanced by a horizontal rotary index table through a series of operational locations. A connector tab electrically connected to and extending from the top of the electrode coil is automatically oriented at one of the locations and is thereafter welded to a cover assembly at another location to which the cover assembly is advanced by a cover placement including a vertical rotary indexing wheel moving synchronously, or in timed sequence, with the horizontal index table. The vertical rotary index wheel includes forwardly extending spindles spaced about the periphery, each spindle releasably and rotatably carrying a cover assembly. The wheel moves the cover assemblies through a sealant applicator station prior to advancing them for placement at the welding location. After welding, the cover assembly is automatically folded down into the open end of the casing; the casing's top edge is then folded over the cover, and the cell is sized to complete the manufacturing operation.

37 Claims, 22 Drawing Figures

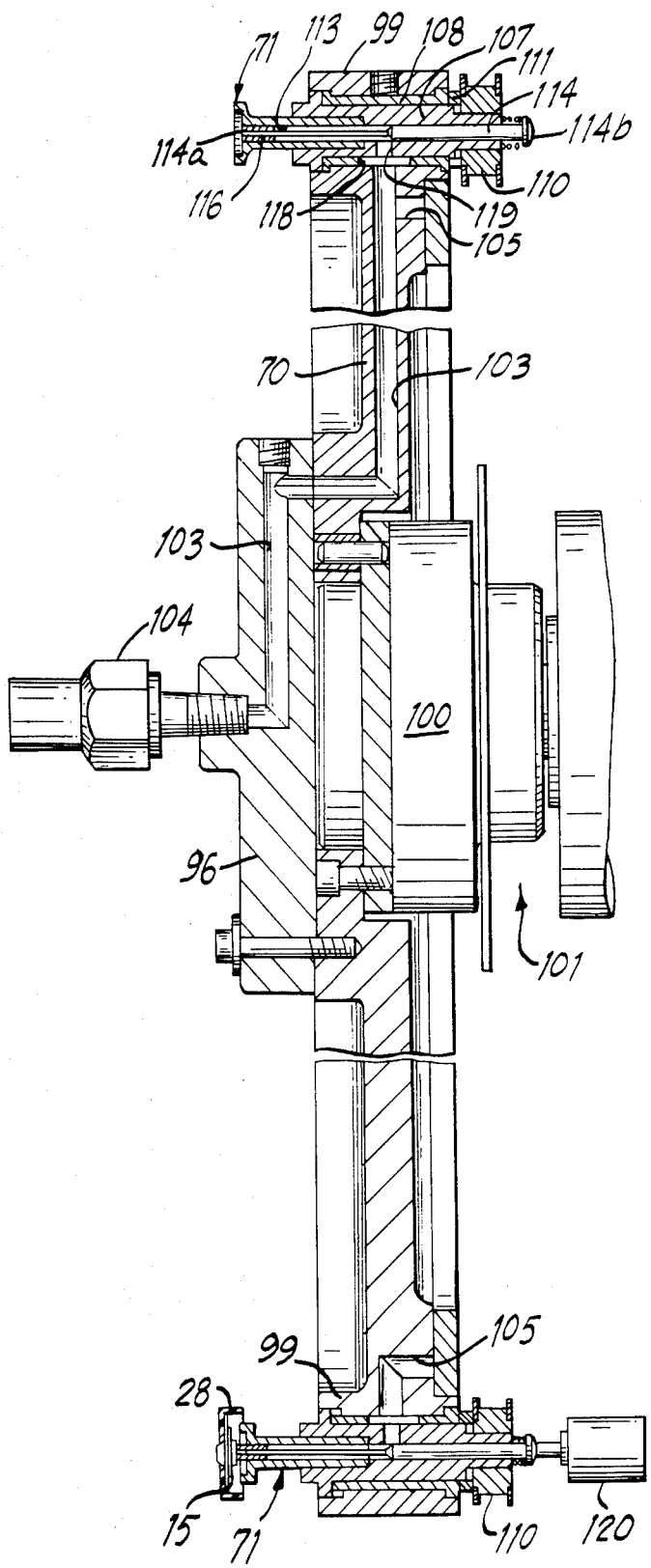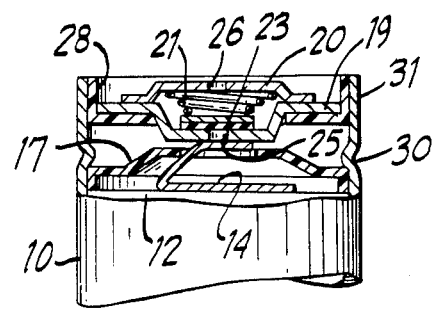
FIG.2
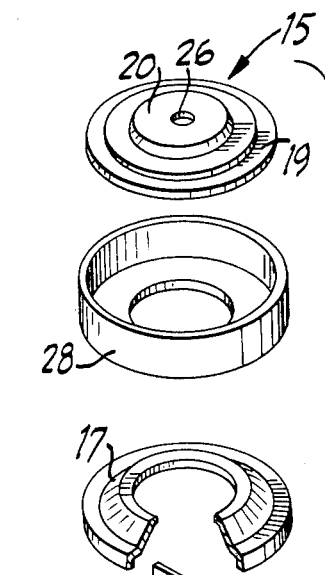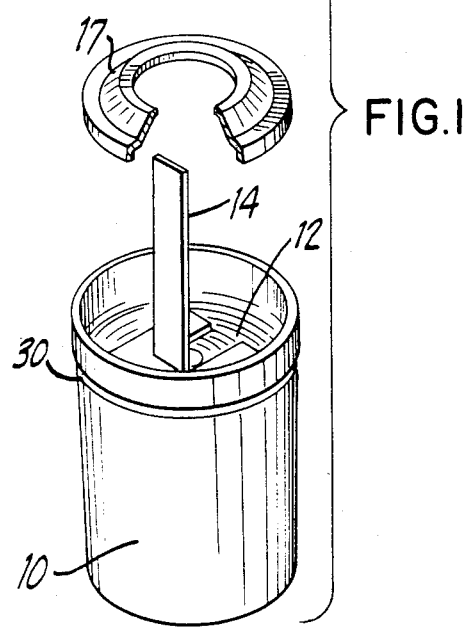
FIG.1
FIG.5

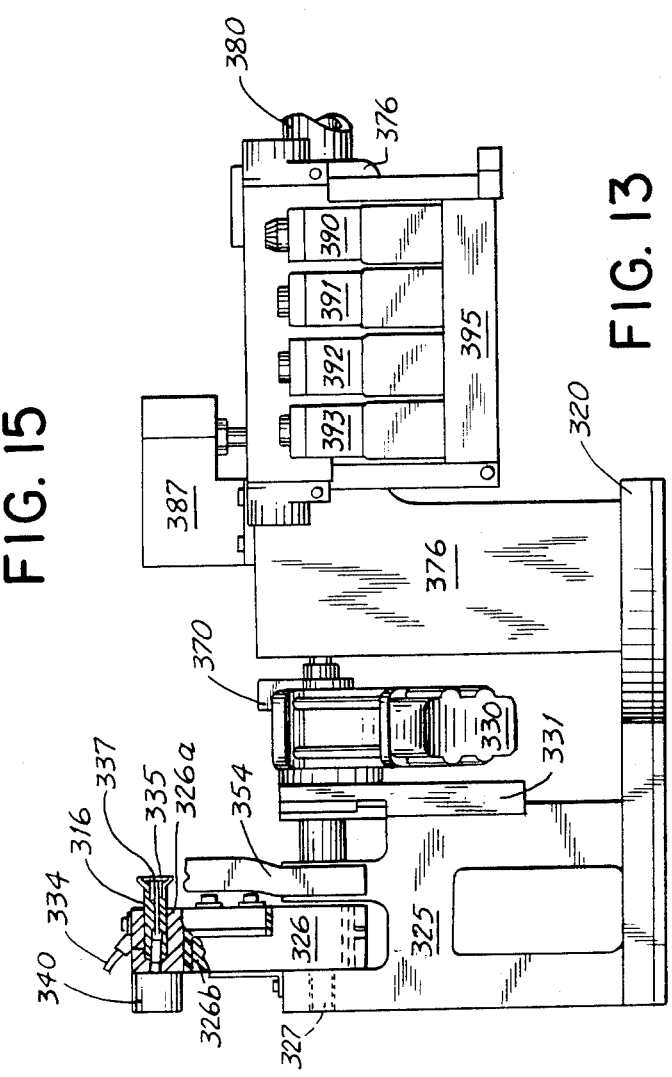

APPARATUS FOR THE AUTOMATIC CLOSURE OF ELECTROCHEMICAL CELLS

This application is a continuation-in-part of U.S. application Ser. No. 271,235, filed June 8, 1981, now abandoned which in turn is a continuation of U.S. application Ser. No. 55,978 filed July 9, 1979, now abandoned.

This invention relates to apparatus for automatically assembling and closing electrochemical cells on a production assembly line. Specifically, it relates to apparatus for bringing together the components of rechargeable electrochemical cells, making electrical connections between the electrodes of the cell and a terminal associated with the cell cover, inserting the cover into the top of the cell casing containing the electrodes, and thereafter closing the cell.

Electrochemical cells to which the present invention is advantageously applied are of the rechargeable type, e.g., nickel-cadmium rechargeable cells packaged in a cylindrical casing, wherein one of the electrical terminals is formed at the top of the cell. In the typical configuration resembling a flashlight battery, the positive cell terminal is formed in the cover member of the cylindrical casing, the casing itself forming the negative terminal. In these cells, the positive and negative plate materials are cut into strip lengths which, with separator material between them, are wound into a coil. The wound coil is then inserted into the preformed cylindrical casing through the open container end.

The coiled plate electrodes may be of the type described in U.S. Pat. Nos. 3,695,935 and 4,029,856. Such battery coil constructions comprise a positive electrode plate having one ruffled edge, a negative plate having a similar ruffled edge, and a separator between the two plates. The plates and separators are wound into the coil with the two plates being longitudinally offset from one another. In this manner, the ruffled edge of one plate extends beyond the flat edge of the other at each end of the coil. When the coiled electrode structure is inserted into the casing, the negative electrode plate electrically contacts the cell casing. This is accomplished either by welding a tab connected to the ruffled edge in the negative plate to the bottom of the casing or by exposing or connecting a longitudinal edge of the negative plate, which forms the outer convolution of the coiled electrodes, to the inner wall of the cylindrical casing.

A connecting conductor tab is welded to the exposed ruffled edge of the positive electrode plate. This tab may be welded to the positive plate either prior or subsequent to insertion of the coil into the casing. The tab, which is described hereinafter, serves as the electrical connection between the positive plate and the positive terminal formed on the cover assembly that closes the cell.

The present invention is concerned primarily with those steps in the assembly of cells of the foregoing type in which the cover assembly is affixed to the conductor tab extending from the electrode coil, and then placed into the open end of the casing where it is permanently mechanically joined to the casing in sealed relation thereto.

Many of the manufacturing operations described generally above have been successfully reduced to automation, thereby enabling the production of rechargeable electrochemical cells more efficiently and with a higher overall quality factor. For example, recent developments have enabled the electrode coil assembly to be automatically wound and automatically inserted into a cylindrical cell casing. Similarly, special welding apparatus has been constructed in order to place and weld the connector tab onto the coiled cell assembly. Another recent development has been the apparatus for assembling and welding together the components of the vented cell covers that are used in the electrochemical cells. This apparatus is described in the co-pending application of Sugalski et al, Ser. No. 921,208, filed July 3, 1978, assigned to General Electric Company and now abandoned.

Notwithstanding the foregoing developments, several critical operations in the assembly procedure had to be carried out by hand. Specifically, once the vented covers for the cell were assembled, operators manually placed the partially assembled cell, with its electrode coil, in a welding apparatus, located the vented cover assembly and then welded the cover assembly to the positive connector tab. Prior to the welding operation, the operator also had to place an insulating disk about the cover after the disk had been coated about its edges with "brai" sealant, or tar-like substance, the disk and sealant forming a gas-tight interface between the cover assembly and the edges of the cylindrical casing when the cell is closed. Following the manual welding by the operator, the cover assembly was then folded down into the top of the casing and the semifinished cell transferred to machine stations where the top of the casing is curled over the cover member and insulator disk and thereafter sized so as to firmly seat the cover/insulator in hermetically sealed relationship to the casing.

The placement of the insulator disk about the cover assembly, together with the tab-to-cover welding and cover-folding steps have remained as impediments to the full mechanization of the manufacturing operation. Thus, even though many of the assembly steps were automated, the foregoing hand assembly operations introduced production delays, logistical problems and quality variations. Among the logistical difficulties, for example, were the location and organization of the cover assembly parts, and transportation of the cells with the welded cover to the closing machine. As long as operations were performed by hand, it was found difficult to schedule efficiently the arrival of semi-completed cells to the cell closing machines. Moreover, it was not uncommon to encounter cell damage in transporting cells from the manual welding operation to an automated closing operation.

Among the other problems encountered was the coating of the insulating disk. In order to provide uniform performance in high-quality rechargeable cells, it is necessary to ensure a sealant coating that is both adequate and uniform about the periphery of the insulating seal. In the past, it has been difficult to achieve this uniform coating and, even when achieved, to preclude damage to the coating during transport and the manipulative assembly operations. Still further problems were experienced with the connector tab, and with the weld between the tab and the cover. These problems included twisted or damaged tabs, shorts, incomplete welds, and the like. Again, these defects being caused by the irreproducibility of manual assembly steps. In short, there has existed for some time a compelling need for full mechanization of all the operative assembly steps during cell construction.

It is an object of the present invention to provide an automated apparatus capable of performing, in a new and unique manner, steps which previously were carried out by hand.

Further objects of the invention are to provide a new and improved welding apparatus, together with associated apparatus and components for locating and welding electrochemical cell elements during assembly, and for completing assembly of the cell prior to closing thereof.

In apparatus according to the present invention, a semi-completed cell comprising the casing, the electrode coil and the connector tab extending from the top of the electrode coil, is placed in an indexing table having a plurality of cell receptacles, called "nests". Cells are loaded into the nests, one at a time, as the indexing table is advanced, thereby advancing each cell from one operational location to the next. At various stages in the manufacturing process, the unit is further assembled or operated on at one or more of these locations, and is periodically inspected. On the basis of such inspection, the unit is either advanced for further assembly or rejected, any rejection causing either subsequent operations to be inactivated until the cell is removed from the assembly line, or resulting in immediate stoppage of the system.

Cover assemblies, including their insulating seals, are themselves advanced to the welding station by cover assembly placement means which includes a vertically oriented indexing wheel having a plurality of locations, each of which holds a cover assembly with its associated coated insulating seal. This cover-advancing wheel generally moves synchronously with the cell indexing table and preferably has at least one station for applying a uniform coating of sealant to the rim of the insulating seal. Under certain circumstances, the cover-advancing wheel can also be controlled to advance while the indexing table is stationary.

As the cell casing units are being advanced toward the welding station, they pass through a tab-orienting station which automatically turns the cell so that the cell arrives at the welding station with its tab parallel to the surface of the in-place cover assembly to which it is to be welded. Following welding, the cell passes to a cover folder which, because the cover and tab are given a specific orientation, enables the welded cover to be folded down into the top of the cell casing. Thereafter, the cell unit advances to a curling station for bending the top edge of the cell casing inwardly over the top of the folded-down cover. Next, the cell passes to an automatic sizing dye which further compresses the cell vertically with sufficient pressure to compress the insulating seal about the rim of the cover.

The invention will be far better understood from the following detailed description and drawings, in which:

FIG. 1 is an exploded perspective view of a typical rechargeable electrochemical cell which can be assembled in apparatus according to the invention;

FIG. 2 is a cross-sectional elevation view through the top portion of an assembled cell of the type shown in FIG. 1;

FIG. 5 is a cross-sectional view of the vertical indexing dial of FIG. 4, taken along the line 5—5 in that figure;

FIG. 13–15 are, respectively, front, end and plan views of the cover transfer means and the particular welding apparatus associated therewith;

Figure 20:
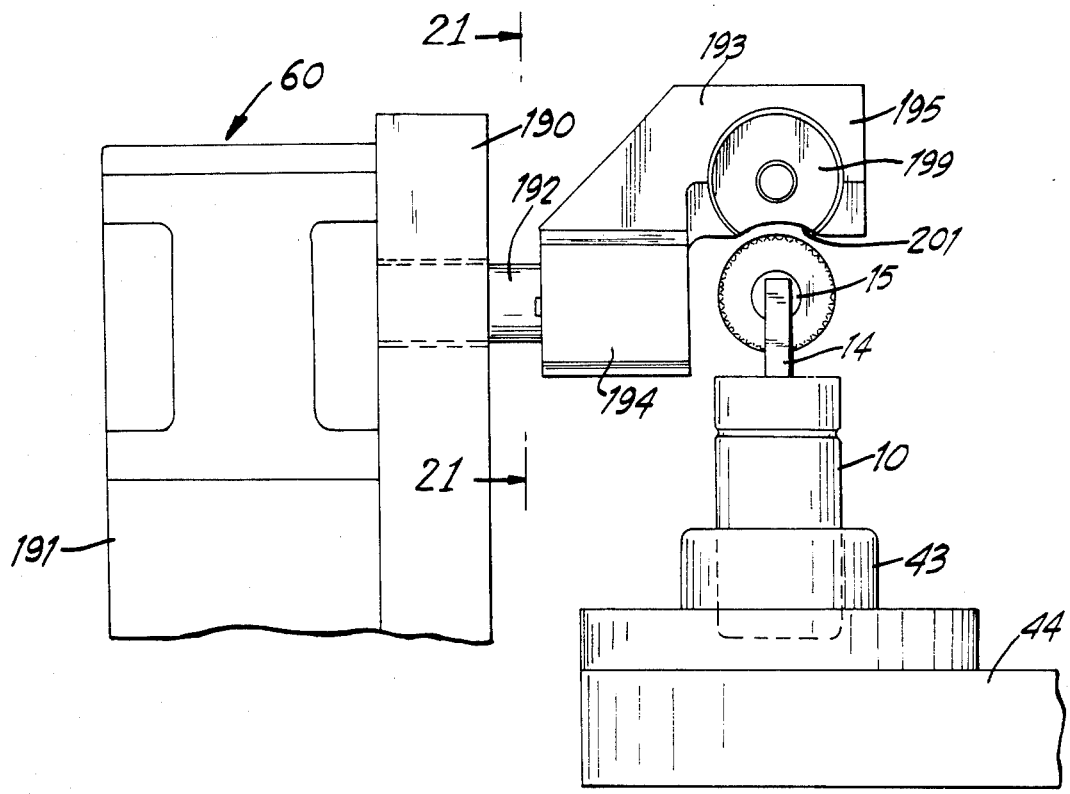
FIG. 20 is a side elevational view looking in the direction of the arrow 20 in FIG. 3, and showing cover folding apparatus useful in the present invention.
Figure 21:
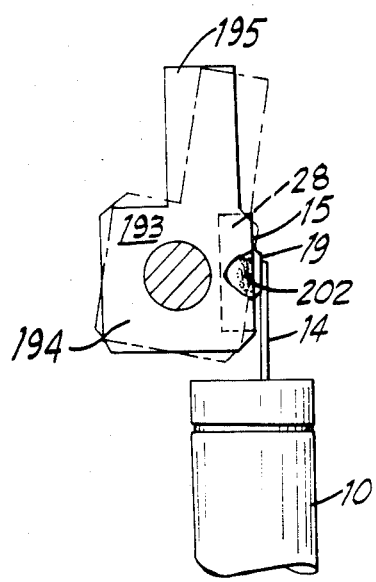
Figure 22:
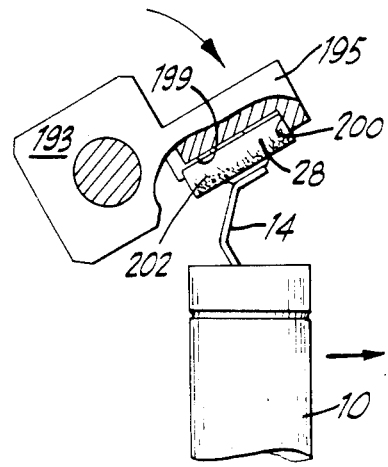

FIG. 21 is a view looking in the direction of the line 21—21 in FIG. 20 and illustrating a cell with the cover assembly welded to the connector tab at the cover-folding station but prior to folding of the cover assembly; and FIG. 22 is a view similar to FIG. 21, illustrating the position of the movable element of the cover folding apparatus in relation to the cell at partial completion of the cover-folding operation.

DESCRIPTION OF PREFERRED EMBODIMENTS

Referring first to FIGS. 1 and 2, a typical rechargeable electrochemical cell comprises a cell casing 10, an electrode coil 12 comprised of positive and negative plates wound together with an interleaved separator, a conductive connector tab 14 welded to the top edge of the coiled positive electrode, and a vented cover assembly 15 receivable in the casing 10. An insulating ring 17 is used to cover the top of the electrode coil and has a central aperture through which extends the tab 14.

The cover is generally disk-shaped and is an assembly of a main body portion 19, a terminal portion 20 and a resealable valve comprised of a spring 21 and valve disk 23 which is adapted to vent excessive internal cell pressures through the holes 25,26 in the cover assembly. The conductive tab 14 is welded to the underside of the cover, so that the cover forms the positive terminal for the cell, the casing being connected to the coiled negative electrode by suitable means (not shown) and thereby constituting the negative terminal. Sealing the cover assembly and cell casing is a dish-shaped insulator 28 which also functions to electrically isolate the cover from the casing. This insulator 28 is compressed about the cover edge between the circumferential groove 30 and the curled-over upper rim 31 of the casing.

The present invention relates to the assembly of the cover to the cell casing and the closing of the cell thereafter.

General Description and Rotary Horizontal Table

Figure 3:
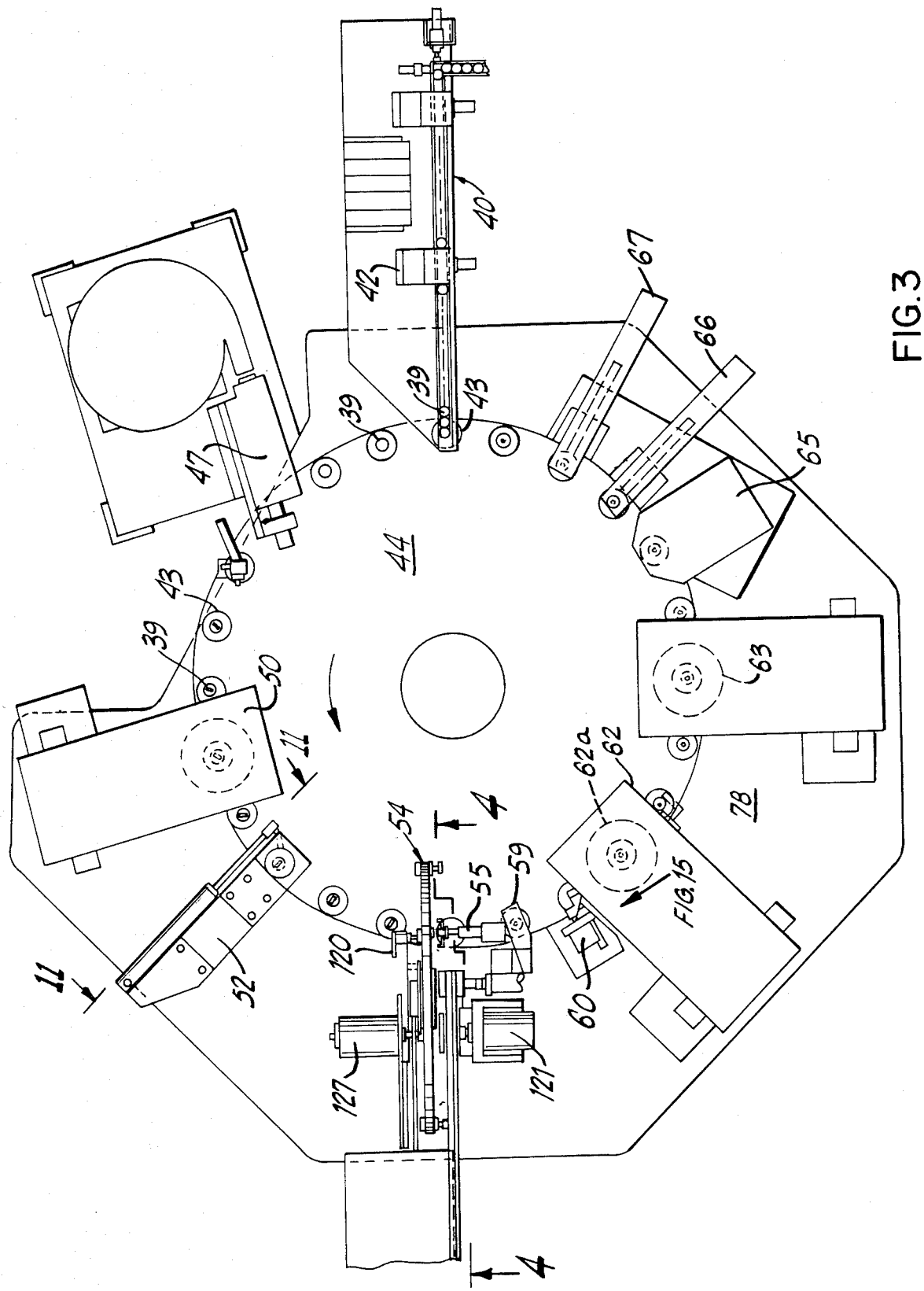
FIG. 3 is a plan view of an apparatus in accordance with this invention, showing the indexing table for receiving and advancing cell casings through a plurality of operative assembly stations and the various units for performing operations on the cell.

Turning now to FIG. 3, the apparatus for assembling cells as described above receives partially completed cells 39 from other manufacturing operations, these cells arriving on a conveyer track 40. These cells 39 include an ungrooved casing containing an electrode coil and a connector tab welded thereto and extending upwardly toward the open end of the casing from the top of the positive electrode.

The motion of partially completed cells along the track 40 is controlled by suitable means (not shown) so that, for example, a cell can be stopped momentarily at a station 42 which dispenses fluid electrolyte into the open end of the cell. This electrolyte is adsorbed into the separator material between the electrode plates. After the electrolyte is added, the partially completed cell continues its travel to the end of the track whereupon an escapement mechanism (not shown) permits the most advanced cell to fall by gravity into the open cell receptacle, or nest 43, carried by a rotary indexing table 44 which transports the cell from the point of loading to the point of unloading.

The indexing table 44 contains twenty-four such nests, one at each of twenty-four separate physical positions about the table's circumference. For convenience, each position has been numbered in FIG. 3, with position #1 being the position at which a cell is loaded into the nest 43 directly under the track 40.

All operations accomplished in the automated process of the FIG. 1 apparatus are executed under control of a digital controller such as the 5TI controller made by Texas Instruments, Inc. Such controllers are well-known in the industry. In general, they receive inputs from the manufacturing operations being controlled and generate output signals which initiate or otherwise control operation of the machines and components involved. By the same token, the controller receives inputs from sensors distributed about the indexing table for detecting empty nests, defective components, improperly executed operations, etc. This information is stored in a self-contained shift register in the controller and used to monitor the status of a cell unit in a particular nest. Thus, such a shift register might have twenty-four storage positions for storing the presence or absence of a binary bit representing a particular condition associated with the nest in question.

In connection with the nest at position #1 in FIG. 3, a photoresponsive sensor (not shown) at the end of track 40 is used to determine whether a partially completed cell from the track has been properly received by the nest. If it has not, a signal is generated and sent to the shift register (not shown) associated with the controller, such that no further operations are performed as to that nest as it is indexed through the remaining twenty-three positions. It will be understood that the indexing table rotates step-wise by predetermined increments, i.e., 1/24 rotation per step. After each incremental motion, the table remains stationary for a short period of time (the dwell time) during which operations are performed on the cells carried in the nests.

The first manipulative step on the partially completed cell takes place at position #4, where the top insulator 17 is placed in the top of the cell. The apparatus 47 for performing this step of the manufacturing operation is described in our copending application Ser. No. 923,261, filed July 10, 1978 and now abandoned. As will be seen from FIGS. 1 and 2, when this insulator is in place, it substantially covers the exposed edges of the electrode coil, with the upstanding tab received in the central hole of the insulator. At position #5, the presence of an insulator 17 in the cell is detected by the downward stroke of a probe 48. If an insulator is absent, the probe sends an "inactive" signal to the proper input of the shift register, and that cell therefore will not be closed up. Rather, it will be permitted to travel to the remaining stations without any further operations being performed on it and will be ejected at position #23 as a defective cell or as a cell to be reworked. If the probe senses the absence of an insulator for two or more consecutive cells, the machine is automatically shut down and the insulator feed stock problem or other problem may be corrected. Similarly, any of the sensors downstream may be programmed to generate an 37 inactive" signal or to shut down the machine immediately upon sensing a defect or upon detecting an excessive rate of abnormalcy.

At position #8, the cell casing is grooved about its upper periphery by the downstroke of a die operated by grooving unit 50. Once again, a sensor associated with the grooving station detects whether the cell has been jammed in the die or properly released. A jammed condition signals the entire machine to shut down. At this point, the cell is ready to have its cover assembly attached to the upstanding connector tab. Before this can occur, however, the tab must be properly aligned so that it is correctly oriented parallel to the undersurface of the cover when the cell arrives at the weld station. This is necessary because cells which are loaded onto the index table have a random tab orientation. In the present invention, tab orientation is accomplished at position #10 with tab orientation unit 52. The manner in which this is accomplished will be described in detail in connection with FIGS. 16–19.

Figure 4:
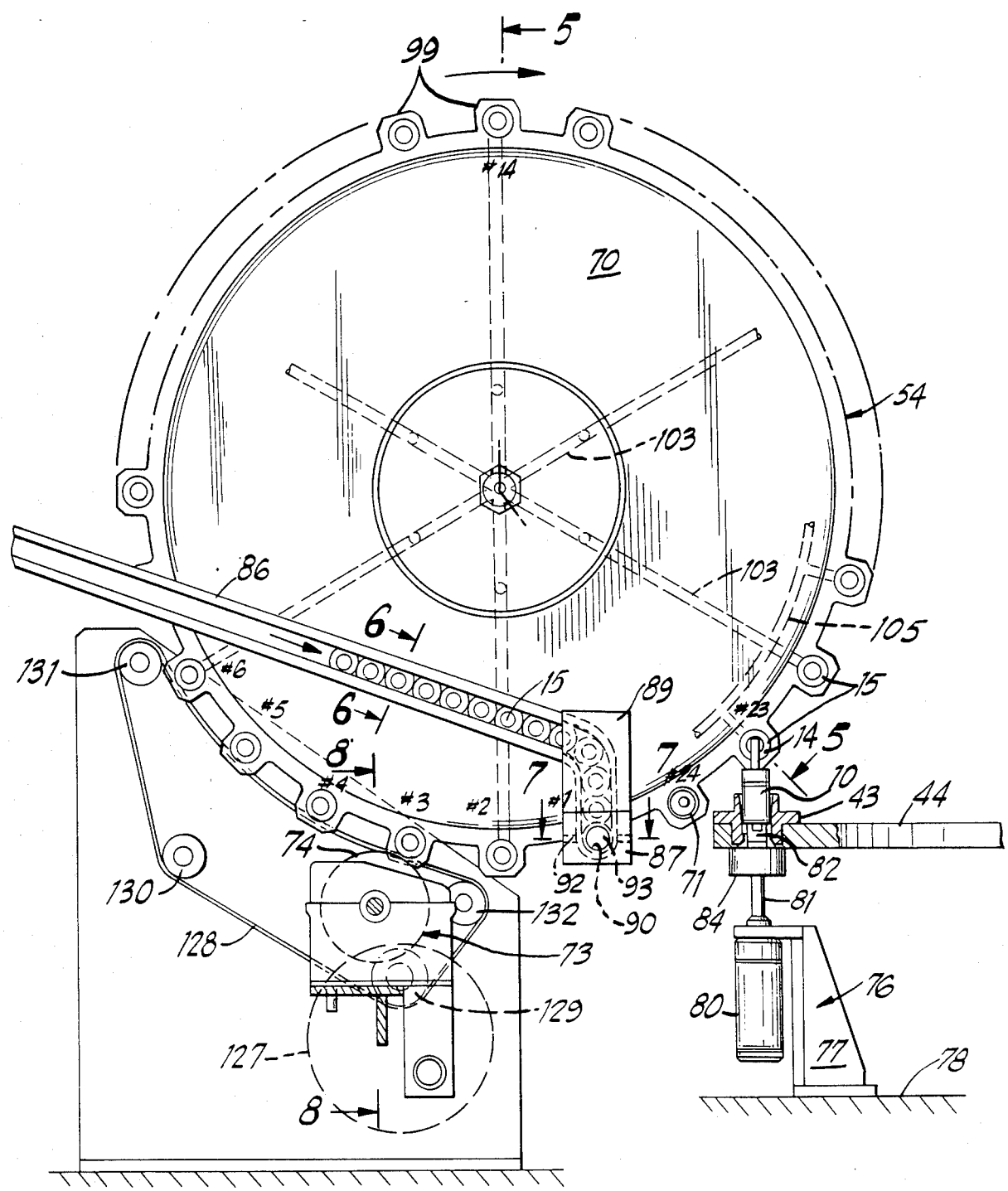
FIG. 4 is an elevation view, partly in cross-section and taken along the line 4—4 in FIG. 3, showing one embodiment of the vertical indexing dial for receiving and carrying cell cover assemblies to an insulator coating station and to a welding station.

Joining of the cell cover assembly to the tab occurs at station #13. In this operation, the cell, with its tab properly oriented parallel to the undersurface of the cover assembly, is aligned with the cover assembly, which is transported into the welding station by a vertical rotary indexing dial 54 (FIGS. 4 and 5). A welding head 55 (see FIG. 10) having a pair of weld electrodes 56, 57 is then brought forward so as to press the flexible tab 14 to the cover 15. After a delay, the weld current is initiated, thereby mechanically and electrically affixing the tab to the cover. Following a second short delay, the electrodes are retracted and simultaneously pivoted out of the line of travel of advancing cells. The welded cover is next pushed away from the spindle which holds it. Once the cover assembly, now welded to the tab, is forward and clear of the spindle, the cell is lowered back into its nest where it may then be advanced to the next station.

At station #14, the cell encounters a photoelectric detector 59 that senses the presence or absence of a welded cover assembly. If a properly welded cover assembly is detected, an "active" status signal is continued for that particular nest, and the presence of such a signal causes the next operation to proceed. That operation is to fold the welded cover down into the open top of the cell casing. At the completion of that step, the cell has the configuration shown in FIG. 2, the cover assembly and insulation-seal 28 being in place at the upper interior of the casing 10.

Upon leaving the cover-folding apparatus 60 at station #15, the cell advances to station #16, where the top rim 31 of the casing is curled over the top of the insulator disk 28. This is accomplished by the downstroke of a curling die 62a operated by curling unit 62. Once more, a jam detector monitors the condition of the die for a jammed condition and signals stoppage of the index table if an abnormal condition is detected. At position #19, a sizing die 63 is brought down over the cell as the last manufacturing step. A detector is located at the sizing station so as to detect any jamming of the die by a cell.

At location #21 of the index table, the cell is subjected to an electrical test. The nature of this test, and the apparatus 65 used to perform it, are described in Shah application Ser. No. 812,727, filed July 5, 1977 and now abandoned and in Strickland application Ser. No. 882,354, filed Mar. 1, 1978 and now U.S. Pat. No. 4,204,161, both such applications being assigned to the present assignee. Briefly, the electrical monitoring apparatus includes a probe which is brought down into contact with the terminals of the cell. While the probe is in contact with the terminals, a high constant-current pulse of short duration is applied to the cell terminals, so as to develop an increased charge voltage between the cell terminals. Before, during and after the application of this current, the cell voltage is sampled and compared against predetermined maxima and minima. In most cases this single measurement and comparison provide an indication of low resistance shorts, insufficient electrolyte material and unsatisfactory cell voltage. Following this electrical test, the cells advance to one of two ejector chutes, disposed at positions #22 and #23. As described in the foregoing application, Ser. No. 812,727, cells are ejected upwardly where they fall into vertically descending chutes, the acceptable cells being passed through the chute 66 at position #22, and the rejected cells through the chute 67 at position #23.

It will be recalled that the shift register in the main controller maintains the status of all cells from the point of loading at location #1 through the ejection station at location #23. So long as the nest position retains an "active" signal, the cell is considered acceptable and is removed at the chute 66 at location #22. If for some reason a nest is associated with an "inactive" status, that cell is ejected to the chute 67 at position #23. An inactive status pertains to all nest positions which are empty or which contain defective or incomplete cells.

Rotary Vertical Dial

Turning to FIGS. 4 and 5, one form of vertical indexing wheel or dial 54, which transports the cover assemblies in synchronism with the horizontal index table, is shown in detail. (Another similar form of vertical dial is described in connection with FIGS. 11–15). The vertical dial generally comprises a wheel, or disk 70, having disposed about its periphery a plurality of evenly spaced spindles 71. There are twenty-four spindles, corresponding to the number of positions on the index table. Each spindle is adapted to receive and carry a cover assembly 15 from the point of reception to a liquid sealant applicator 73 and, thereafter, to the position at which the connector tab of the cell is welded to the undersurface of the cover. In FIG. 4, the position at which the cover is received is designated as position #1. The vertical dial rotates in a clockwise direction, as shown by the arrow, and the position numbers therefore increase in the clockwise direction. The vertical dial moves in steps, as does the horizontal index table. It is during the motion dwell time that operations are performed on the cover assemblies. Thus, during the dwell period, a cover is loaded onto the spindle at position #1. At position #2, a sensor (not shown) detects whether a part has been properly loaded. If two consecutive "no load" conditions are detected, the system is shut down since this would indicate improper functioning of the cover loading apparatus.

At position #3 of the vertical dial, the insulator disk 28 which is attached to the cover assembly is brought into contact with the surface of a rotating wheel 74 coated with a brai sealant. As the spindle nears position #3, it is rotated (in a manner hereinafter described) in a direction counter to the direction of the brai applicator wheel so as to apply an even coating of brai about the outer rim of the cup-shaped insulator 28. In that connection, the brai applicator wheel is slightly stepped so that the brai coating material is applied also to a small portion of the underside of the insulator. After leaving the brai applicator 73 at position #3, the spindle continues to rotate so as to spin the cover assembly and ensure evenly distributed coating on the disk-shaped insulator. Spinning of the cover assembly continues to position #6 until the coating has had sufficient time to "set" and preclude running or dripping of the coating material. If no cover is present, however, the #2 nest on the horizontal table may be given an inactive status so that no additional operations will be attempted on that partially completed cell during its transport.

The next operation is performed on the cover assembly when it reaches position #23. This is the weld position, and the center of the spindle is vertically aligned with the center of the cell nest at position #13 on the horizontal index table. Since the horizontal index table and the vertical indexing dial are synchronized, the cover assembly 15 at position #23 of the vertical dial is stationary when the cell casing 10 at position #13 is stationary. During the dwell period, the cell is raised vertically, as shown in FIG. 4, to bring the upstanding connector tab 14 into registration with the undersurface of the cover member 15.

FIG. 4 illustrates in cross-section the edge of the index table 44, including the nest 43, at station #13, and an actuating mechanism 76 for raising the cell in the nest to the appropriate level for welding. As shown, this actuation mechanism includes a support bracket 77 carried by mounting platform 78. A controllable air cylinder 80 includes a piston 81 that is extensible upwardly through the bottom of the nest to contact the bottom of the partially completed cell casing 10 and raise it to the desired vertical level. The air cylinder piston has at its upper end a magnetic tip 82 with a "U" shaped configuration. This magnetized tip stabilizes the cell by magnetic forces during the time that it is raised out of position. In that regard, the inner wall of the nest is outwardly tapered near its open end so as to assist in guiding the cell back into the nest when the piston is lowered. The piston also includes a stop member 84 which is engageable with the underside of the index table 44 when the air piston reaches its desired extension.

During the time that the air cylinder piston 81 is extended and the cell is in its proper vertical location for welding, the weld head 55 is quickly brought into contact with the tab and the weld current applied. Thereafter, the weld head is retracted, the cover assembly is released from the spindle at position #23 of the vertical dial and the air cylinder piston retracted so as to return the cell, with its cover now attached, to the nest. The horizontal index table is then indexed ahead to bring the next cell into the weld station #13. At the same time, the vertical dial 54 is also indexed ahead so as to bring the next cover assembly to the welding location at position #23 of the vertical dial.

At the last station, #24, of the vertical dial, any cover assemblies which were not either welded or released at position #23, are picked off so as to clear the spindle prior to reception of a cover assembly from the loading mechanism, which will now be described.

Figure 6:
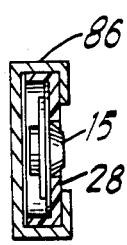
FIG. 6 is a cross-sectional view taken along the line 6—6 in FIG. 4, showing a portion of the mechanism for loading cover assemblies onto the vertical indexing dial.
Figure 7:
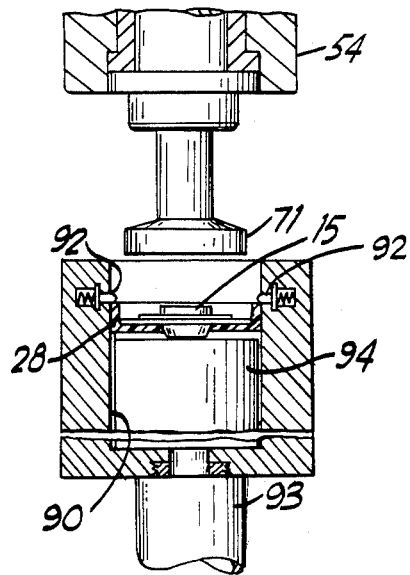
FIG. 7 is a cross-sectional view taken along the line 7—7 in FIG. 4, showing another portion of the mechanism for loading cover assemblies onto the vertical indexing dial.

The loading mechanism, shown in FIGS. 4, 6 and 7, consists fundamentally of an inclined horizontal track 86 by which a plurality of vertically oriented cover assemblies 15, with the insulator disks 28 attached thereto, are gravitationally fed to the loading station at position #1 of the vertical dial. At the end of the inclined track the covers make the transition from horizontal to vertical. If desired, the inclined track can be vibrated so as to ensure proper feeding of the cover assemblies and can be inclined at a lesser angle than shown (e.g., a few degrees from horizontal).

At the bottom of track section 89 is a horizontally extending mechanical member 87 having a cylindrical guide channel 90 which aligns the lowermost cover assembly with the spindle at position #1. Referring to FIG. 7, when the cover assembly reaches the guide chute it is restrained by a pair of resiliently biased fingers 92. At the proper time during the dwell period of the vertical dial, an air cylinder 93 is energized to cause the plunger 94 at the end of its piston to push the cover assembly past the resilient fingers and through the guide channel 90 into contact with the spindle. The piston of the air cylinder is next withdrawn, thus permitting the next cover assembly to fall into place at the end of the track for loading of the next consecutive spindle.

It should be noted that the insulator disk 28 associated with the cover 15 may be automatically placed onto the cover during its travel toward the vertical indexing dial. This may be done by bringing the covers 15 and the insulator disks 28 in separate tracks into registration and then, in a manner similar to loading of the spindles of the vertical dial, bringing an air cylinder into contact with the insulator disk to push it over the edge of the cover. Therefore, the combined cover assemblies would enter the track 86. This type of arrangement is used in the alternate embodiment shown in FIG. 11.

The details of the spindles 71 on the vertical dial 54 and the manner in which the cover assemblies are held onto the spindles are most clearly seen in the cross-sectional view of FIG. 5 (Sheet No. 1 of the drawings). The vertical dial comprises a hub portion 96 and an integral disk portion 70 made of machined steel. At the periphery of the disk are twenty-four evenly spaced bosses 99, each carrying one of the spindles. The vertical dial is driven through a shaft which is keyed to a second hub 100 forming one element of an overload clutch 101. Drive power is coupled from a drive mechanism (not shown) through the clutch 101 to the vertical dial 54. The front hub portion 96 of the dial and the disk portion 70 are provided with six channels 103 which extend radially outwardly from the center of the hub. A pneumatic swivel joint fixture 104 extends from the front side of the hub for the purpose of coupling a pneumatic line to which vacuum is applied. This vacuum, or negative pressure, is communicated to each of the twenty-four spindles via the radially extending channels 103 and the arcuate channels 105 interconnecting all of the spindles.

Each spindle 71 is carried by a rotatable spindle drive shaft 107 journaled in a bearing 108 supported by the boss 99. At the rear of the boss is a gearbelt pulley 110 mounted to the rear of the spindle driveshaft and separated from the boss by an annular spacer 111. The spindle itself, as well as its associated driveshaft, contain a central bore 113 into which is slidably fitted an ejector pin 114 that is spring-loaded in the retracted position, as shown. The forward section 114a of the pin is of a smaller diameter. It is slidably received in a ring magnet 116 fixedly mounted in the end of the spindle. Vacuum is transferred to the forward end of the spindle by the channel 118 formed in bearing 108 and the hole 119 extending through the driveshaft into the central bore of the spindle. This negative pressure is transmitted to the cupped spindle end via the central bore 113 of the spindle drive shaft.

When a cover assembly with its associated cover insulator is pushed by the cover loading actuator up against the end of the spindle, a vacuum is created and is of sufficient force to maintain the cover assembly on the spindle as it is transported by the vertical dial. It will be noted that the top side of the cover assembly abuts, or very nearly abuts, the magnetic element at the end of the spindle, such that magnetic forces assist in retaining the cover assembly on the spindle in the event of a partial loss of vacuum. The ejector pin, being slidably mounted in the spindle, is activated following the welding operation so as to release the cover assembly from the vacuum and magnet following welding. For that purpose, the ejector pin has an enlarged rounded end portion 114b at the rear, this portion being engaged by the piston of the release air cylinder actuator 120 seen at the lower part of FIG. 5 at the rear of the vertical dial. The cover removal actuator is energized by the digital controller.

Figure 8:
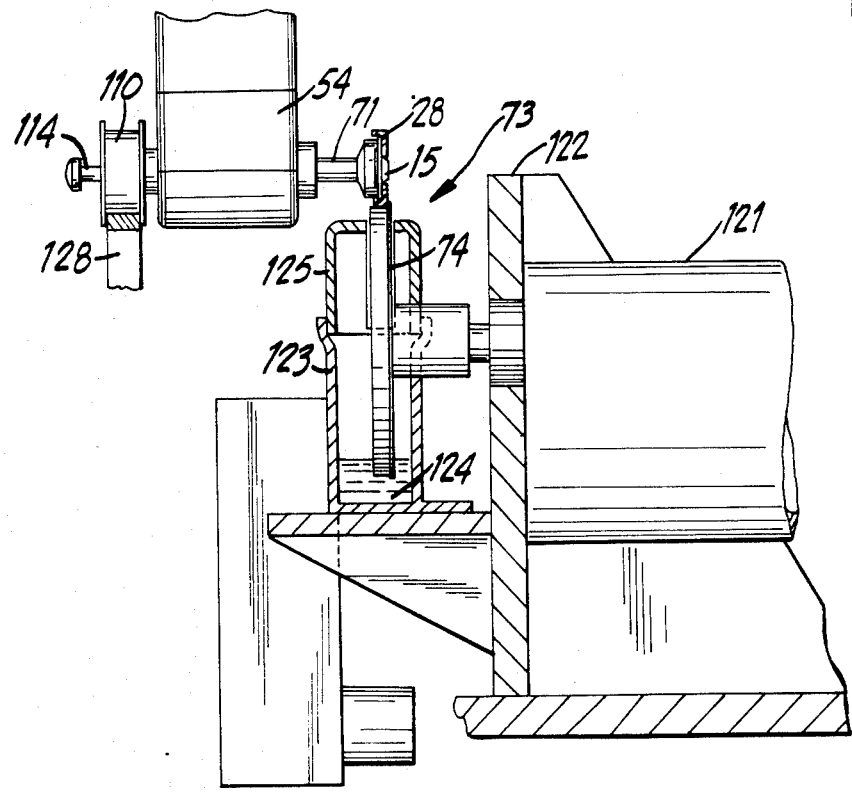
FIG. 8 is a view in partial cross-section taken along the line 8—8 in FIG. 4 and showing elements of the apparatus for applying sealant to the cell cover assemblies.

The sealant applicator 73 is illustrated in FIG. 8. As earlier mentioned, fluid sealant material is applied to the rim of the insulator disk 28 by an applicator wheel 74. This wheel is continuously driven by a motor 121 mounted to a frame 122. At the front of this frame is a reservoir 123 which contains the liquid sealant 124. As the applicator wheel 74 rotates, it picks up liquid sealant 124 from the reservoir. The reservoir 123 includes a cover 125 having a slot through which the rotating wheel 74 projects. It will be seen that the applicator wheel 74 is stepped at its rim so that sealant material is applied not only to the rim of the insulator disk 28, but also to a portion of the undersurface.

When the spindle containing the cover assembly to be coated is in the vicinity of the wheel 74, the gearbelt pulley 110 at the rear of that spindle is engaged by drive belt 128. Referring again to FIG. 4, the drive belt 128 is driven by a pulley 129 connected to the drive motor 127, and is guided over a series of pulleys 130-132. Pulleys 131 and 132 are disposed such that the drive belt pulleys 110 at the rear of the spindles at spindle positions #3-6 are engaged by the moving pulley. This causes all of the spindles engaged by the gearbelt at those positions to rotate, as previously noted.

Welding Head

Figure 9:
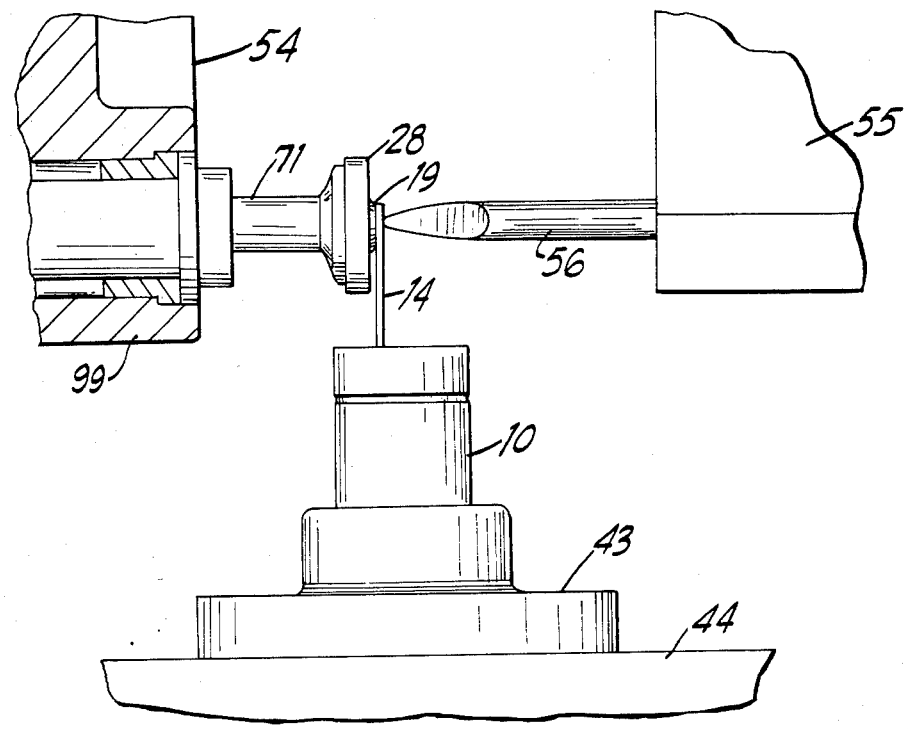
FIG. 9 is an enlarged partial elevation view illustrating the top portion of a cell and one embodiment of the apparatus for welding the connector tab to the cover assembly.

FIG. 9 is an enlarged view showing the relative positions of the welding head 55, the spindle 71 carrying the cover assembly to be welded, the cell casing and the nest 43 on the indexing table. The welding head is a commercially available item manufactured by Unitek, Inc. and is one of two types of welders disclosed herein. The other type is described in connection with FIGS. 11-15. The details of this particular welding head is illustrated in the perspective view of FIG. 10. The welding head 55 comprises a pair of conductive current-carrying electrode mounting blocks for each of the two weld electrodes 56, 57, the electrode 56 being the positive weld electrode and the electrode 57 being the counter electrode. Upper mounting blocks 140 are clamped in opposed relationship about the weld head actuating shaft 142. Lower mounting blocks 143 are resiliently attached to upper mounting blocks 140 by leaf springs screwed to the forward and rear faces of blocks 143. These leaf springs are approximately 0.015 inches in thickness and are constructed from spring steel. Blocks 140 and 143 are spaced from each other by approximately 1/32 inch, the gap between these opposing blocks having one or more insulating layers 147.

Weld electrodes 56, 57 are mounted between lower mounting blocks 143 and bottom blocks 148, the insulating layers 147 also being located between opposed mounting blocks 148.

Actuating shaft 142 is driven by air cylinder 150. In order to effect a weld, the air cylinder 150 is actuated to move the entire weld head forwardly toward the tab 14 and cover 15. Leaf springs 145 bring about a resilient coupling between the rigid shaft 142 and the weld electrodes 56, 57 so as to permit self-alignment of the weld electrodes with the cover 15. Upon completion of the weld, the air cylinder 150 causes the shaft 142 to retract. This shaft 142 is slidably received within a sleeve 151 which provides a pair of spiral grooves 152 each receiving a laterally extending pin 153 affixed to the shaft 142. As the shaft 142 is withdrawn, the spiral grooves 152, by camming action, pivot the entire welding head 55 about the axis of the shaft 142. This pivots the welding head 55 out of the way of the line of travel of cells as they are indexed from one position to the next.

Alternate Cover Placement Means

FIGS. 11-15 illustrate an alternate embodiment of the cover placement means for advancing and placing cover assemblies at the proper location for the welding of the cover assemblies to the connecting tabs of the cell. Generally speaking, its function is identical to the equipment already described, but it includes certain refinements offering the advantage of flexibility upon encountering abnormal conditions in the supply of cover assemblies.

Figure 11:
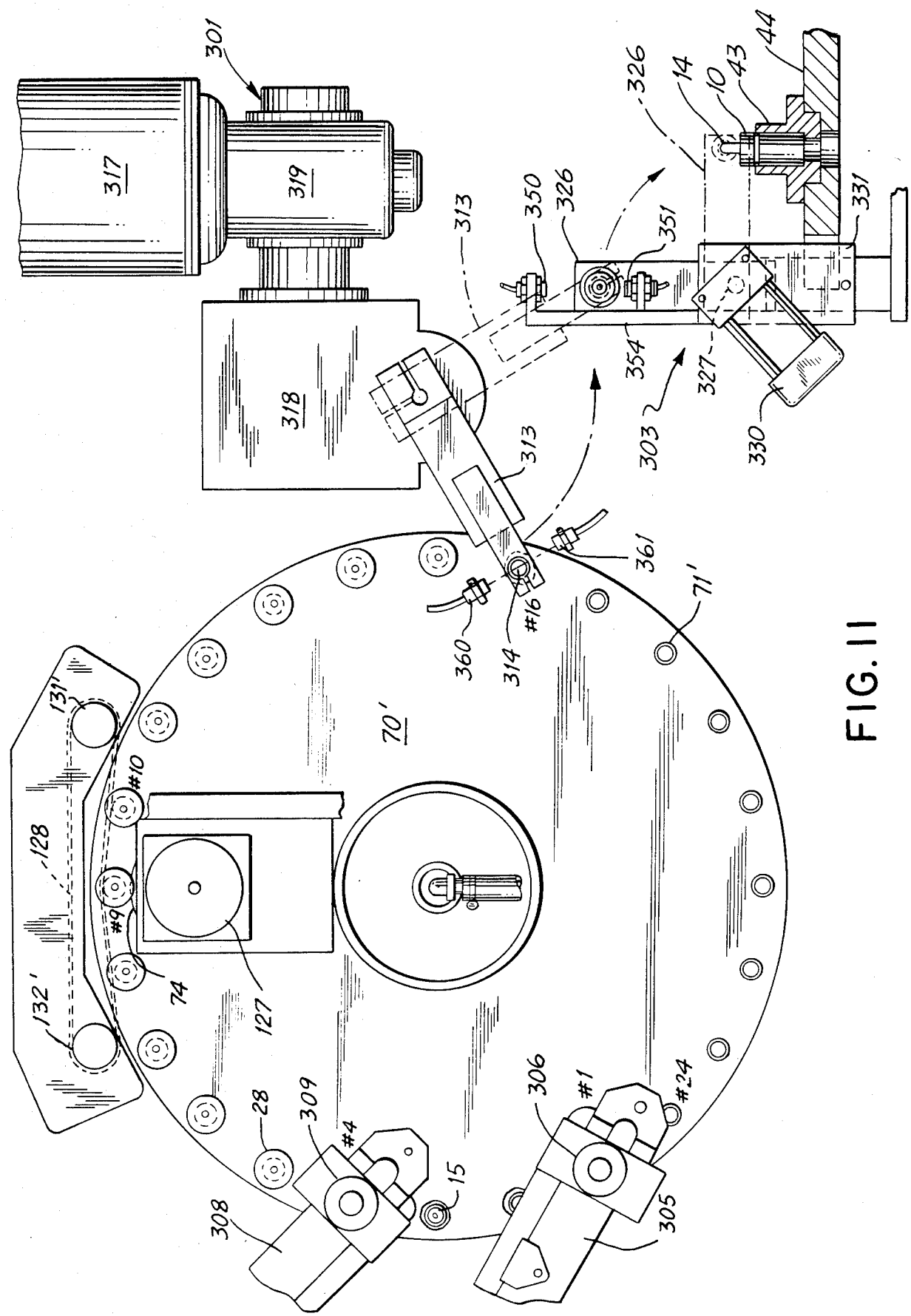
FIG. 11 is an elevation view, partly in cross-section, similar to FIG. 4, and illustrating an alternate embodiment of the cover placement means including the vertical dial and intermediate cover transfer apparatus.

Referring to FIG. 11, the alternate embodiment is seen to include a rotary vertical dial 70' similar to the dial 70, the identical horizontal indexing table 44, and a pair of intermediate elements comprised of a pick-and-place (pick/place) unit 301 and a cover transfer unit 303. It is the function of these two units, which are operationally intermediate the vertical dial and the welding apparatus 304 (FIG. 12), to transfer and place cover assemblies into position for welding at the appropriate time. One advantage of employing these intermediate units between the vertical and horizontal dials is that the two dials may be operated separately in accordance with a programmed sequence. Another advantage is the ability to provide a more positive pick-off of cover assemblies from the vertical dial.

Still referring to FIG. 11, the vertical dial 70' is functionally identical to the dial 70. However, the places at which the cover assemblies, or covers, are loaded onto the spindles 71', and at which the sealant is applied to the cover insulator 28 are relocated. Specifically, in this embodiment, insulator 28 is placed on the metallic cover 15 while the latter is in place on one of the spindles. Metal covers are fed from a hopper (not shown) down an inclined loading track 305. When a metal cover part reaches the end of the track 305, and when the dial 70' is stationary, an air cylinder actuator 306 pushes the cover 15 onto the spindle 71' that is then in registration with the end of the track. This position has been arbitrarily labeled as position #1 in FIG. 11 for reference purposes. As each spindle 71' comes to rest at position #1, a metal cover is placed on it. These covers are advanced seriatum to position #4. There the cover is in registration with the end of a second loading track 308 containing insulators 28 supplied by a second hopper (not shown). A pneumatic actuator 309 pushes the insulator out of the track and over the edge of the cover 15 to form the cover/insulator assembly. This assembly is carried by one of the spindles 71' as shown, for example, in FIG. 8. In order to ensure that the insulator 28 is retained by the metal part 15, it may be provided with a slight ridge which yieldably overrides the edge of the metal part under the force applied by the actuator 309.

The cover/insulator assemblies are carried by the rotary vertical dial 70' to position #9, where a sealant is applied to the edge of the insulator 28, as earlier described. Thus, in position #9, the cover assembly encounters the rotating sealant applicator wheel 74', driven by the motor 127'. A drive belt 128' running between the two pulleys 131' and 132' engages the spindle's gear belt pulley 110' (FIG. 12) to cause the spindle to turn and ensure even distribution of the sealant, as before.

From the sealant applicator, the cover assemblies advance step-wise to position #16, where they may be picked off by the pick/place unit 301. This unit comprises a movable arm 313 having a pneumatic nozzle 314 (FIG. 12) at its end. This nozzle contacts the cover assembly and, by vacuum, captures it. Thereupon the arm is moved away from the plane of the dial 70' and is rotated to the position shown in phantom in FIG. 11 so as to be aligned with a weld spindle 316 associated with the cover transfer apparatus 303. Thereupon, the pick/place arm 313 moves toward the weld spindle 316 and places the cover on it. The pick/place arm 313 next retracts from the spindle 316 and is now free to return to its original position for picking up the next cover assembly. The motion of this arm 313 is established by the pick-and-place- mechanism 318 driven through gear box 319 by the motor 317, the elements 318-320 all comprising part of the pick-and-place apparatus 301. This apparatus is of a type known to those in the art, such as the commercially available "Stelron (Transpart)" Model No. J-OA120 1.5.

Placing Covers In Position For Welding

Figure 12:
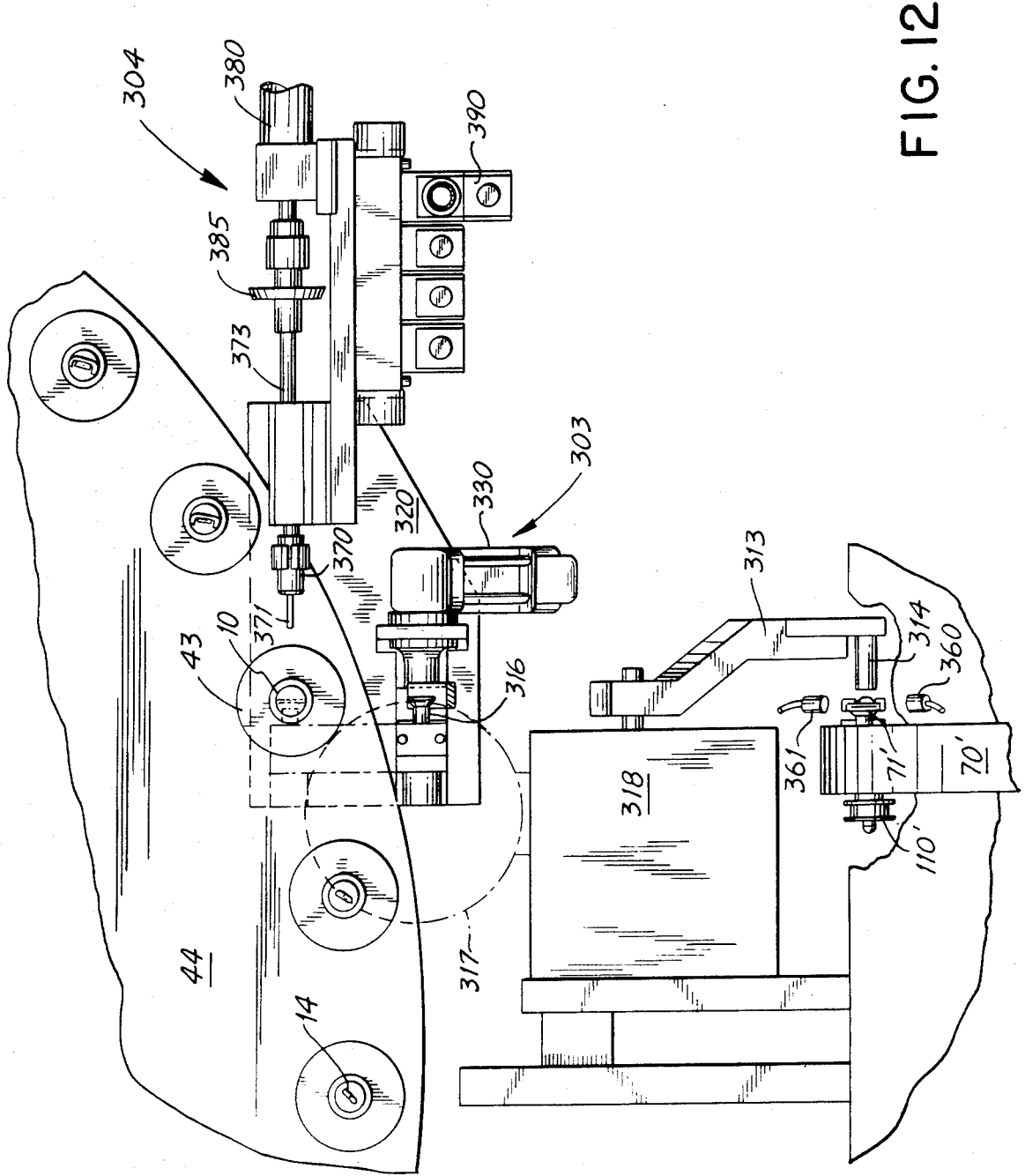
FIG. 12 is a partial plan view similar to FIG. 3, illustrating a portion of the indexing table and its relationship to the cover placement means of FIG. 11.

The cover transfer apparatus 303 illustrated in the lower right portion of FIG. 11 is also seen in the plan view of FIG. 12, along with the welder 304. The details of the transfer/welder unit are more completely shown in the views of FIGS. 13-15, and reference may be made to any of these figures in the ensuing description of operation.

Once a cover assembly has been captured by the weld spindle 316, it is moved into position for welding. This is achieved by the apparatus 303, which is mounted on a platform 320 carrying both the cover transfer mechanism and the welder mechanism. As best seen in FIGS. 13-15, the cover transfer mechanism comprises a frame 325 in which is journaled an arm 326, rotatable between a vertical position (FIGS. 11 and 14) and a horizontal position (outlined by the phantom lines in FIG. 11). When the arm 326 is horizontal the cover assembly on the spindle 316 is aligned with the upstanding cell tab to which it is to be welded. Rotation of this arm is brought about by activatio of a conventional pneumatic rotary actuator 330 mounted to vertical plate 331.

The weld spindle 316 (see FIG. 13) is in some respects similar to the spindle 71', except that the weld spindle is not rotatable in the arm 326. Instead, it is rigidly fixed in the arm and is fabricated from welding electrode material, as is the end segment 326a of the arm. This arm segment 326a is separated from the remaining segment 326b of the arm by a layer of insulation. A welding cable 334 attached to the top of the arm segment 326a carries the return welding current during the resistance weld operation. Thus the outer portion of the arm 326 is electrically isolated from the remaining elements of the transfer mechanism during welding.

Weld spindle 316 captures cover assemblies placed on it by the combination of magnetic and vacuum forces. Thus, this spindle carries a magnet 335 at its end and has a central bore by which vacuum is transmitted to the exposed end of the spindle. This bore is partially occupied by an ejector pin 337 that travels forwardly when driven by the plunger of a pneumatic actuator 340 mounted to the rotatable arm. It will be understood that the purpose of this ejector pin 337 is to assist in the release of the cover assembly from the weld spindle 316 upon completion of the weld.

The cover transfer mechanism also includes a light sensor (FIG. 14) comprised of a suitable light source 350 and a photoelectric cell 351 secured to the vertical bracket assembly 354. The bracket assembly 354 is in turn fixedly secured to the frame 325 and remains stationary during rotation of arm 326. As will be explained shortly, it is the function of the sensor to detect the proper placement of the cover assembly on the weld spindle 316. As illustrated in FIGS. 11 and 12, a similar light source 360 and photosensor 361 detects the presence or absence of a cover assembly on a spindle 71' at position #16 of the vertical dial.

Welding Apparatus 304

Figure 10:
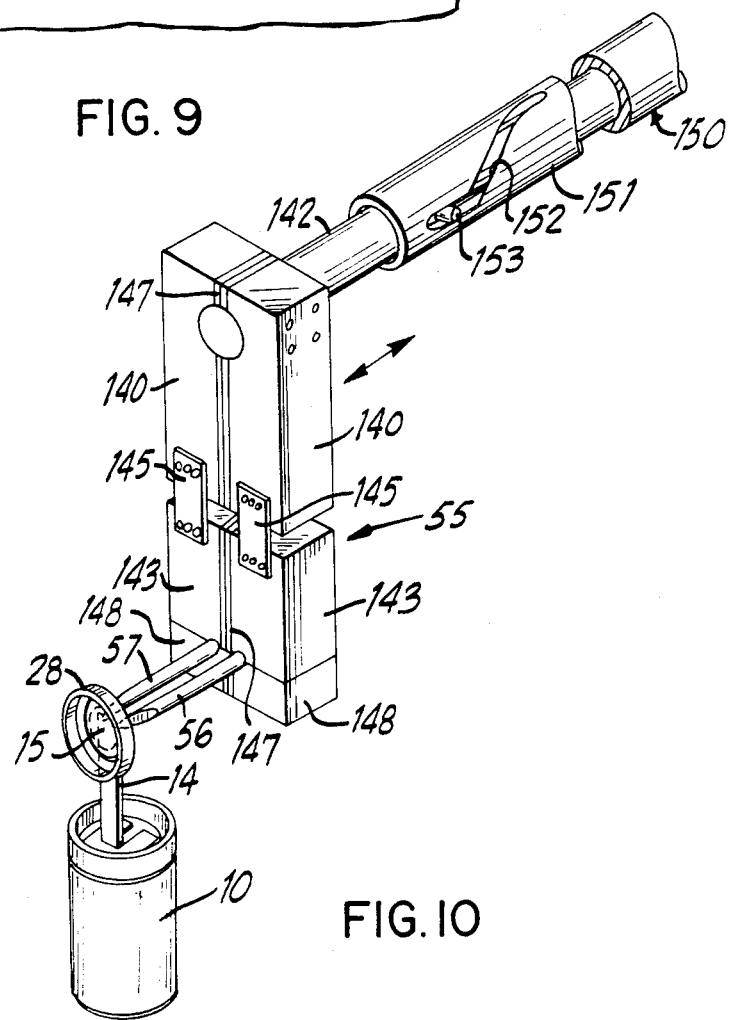
FIG. 10 is a perspective view of one embodiment a suitable welding head, useful in the system of FIG. 4.

This welder is distinguished from that shown in FIGS. 9 and 10 in that the welding head 370 moves axially in a straight line toward and away from the tab 14 to be welded. This welding head, with its welding electrodes 371, is fixed to the end of a shaft 373 that is slidably carried by a bearing block 375, the latter being bolted to an L-shaped frame 376 extending upwardly from the platform 320. Also mounted to the frame 376 is a rear mounting block 379 to which is affixed a linear pneumatic actuator 380 whose linearly movable piston 381 is attached to an intermediate coupling member 383. The coupling member includes a beveled disk cam 385. Upon activating the actuator 380, the cam travels from the position shown to the forward position outlined by the phantom lines. In this position, cam 385 engages and operates an electromechanical switch 387 (FIG. 13) for developing an electrical signal indicating that the weld head is in the forward, welding, position. It should be remarked that the welding head is electrically isolated from the metal frame parts, so that welding current flows from the welding head through the weld electrodes, through the tab-cover joint, and then through weld spindle 316 to the ground return welding cable 334, For the purpose of controlling the operation of the various pneumatic actuators in the system, several pneumatic valves 390-393 are employed (FIGS. 13-15). These valves are affixed to valve block 395, also secured to frame 376. Valve 390 operates the linear pneumatic actuator 380 for moving the welding head into the weld position. Air pressure to the actuator 380 is controlled by the adjustable regulator 398 such that forward movement of the weld head traps the cover assembly and tab between the weld spindle 316 and welding head and thereby applies a predetermined pressure at the weld joint.

Air valves 391-393 control one or more of the other actuators described, such as the ejector pin actuator 340 and the rotary actuator 330 for rotating the arm 326. The opening and closing of these pneumatic valves is controlled by the system's digital controller in response to signals obtained from the various system sensors.

Operation Of System Of FIGS. 11-15

As mentioned earlier, electrical sensors in the system control the operation and timing sequence of the units functioning to place a cover assembly at the weld position at the proper time. The sequence of those events will now be described.

Taking as a temporal reference point the completion of a weld and the return of the rotatable arm 326 to the upright position (this position being sensed by an electromechanical switch, not shown), one of the first events to occur is the generation of an electrical signal by the sensor 350/351 indicating that the weld spindle 316 is empty. Also, sensor 360/361 senses the absence of a cover assembly at position #16. A combination of the two signals from the sensors 350/351 and 360/361, when fed to the controller, generates a signal causing the pick/place 301 unit to operate. (The pick/place unit does not operate until both of these conditions are sensed.)

Next, the pick/place unit 301 picks up the cover assembly at position #16 and places it on the weld spindle 316. Unit 301 will continue to cycle (for predetermined maximum time period, e.g. 10 seconds) until such time as sensors 350/351 detect the presence of a cover assembly on the weld spindle 316. This recycling is carried out in order to provide pick/place unit 301 several opportunities to capture the cover assembly on the vertical dial and place it on weld spindle 316. If that is not accomplished within the predetermined time period, the system shuts down, inasmuch as this is an abnormal condition.

Once the presence of a cover assembly has been sensed on weld spindle 316, the arm 326 rotates to the horizontal position and places the cover assembly in proper position for welding to the unfinished cell which has been indexed by table 44 to the proper location at the weld station. After a short time delay the weld pneumatic actuator 380 is energized (by valve 390) to bring the weld head into contact with the tab 14 of the unfinished cell. A further delay ensures time for the weld head to "settle" before alternating current is applied to the weld electrodes and to create the resistive weld.

After the weld current is terminated, weld actuator 380 is activated to retract the weld head 370. At the same time, a signal is sent to the kick-off actuator 340 to operate ejector pin 337 and thereby ensure a clean release of the cover assembly from the weld spindle. Thereupon rotary actuator 330 is energized to return the transfer arm 326 to the upright position. With the transfer arm upright, and the switch 387 on the welder having sensed the retraction of the welding head, the horizontal table is free to index to the next position and bring the nest 43 containing the next unfinished cell to the weld station. The foregoing sequence then repeats.

The system of FIGS. 11-15 has great flexibility, because it is not necessary to operate the vertical dial and the horizontal dial in positional synchronism. Although the respective indexing of the vertical dial and the horizontal dial ordinarily will operate in a predetermined time sequence, this sequence can be interrupted in cases when, for example, one or more cover assemblies is absent from the vertical dial spindles. In such event, the horizontal table 44 will remain stationary until the arrival of the next cover assembly. This avoids the advancement of non-welded cells out of the weld station. Moreover, the horizontal table can be indexed at any appropriate time during the placement sequence, provided that it is not indexed while the transfer arm 326 is in the horizontal position, and provided further that it is not indexed while the welding head is in the forward position.

Tab Orientation Apparatus

FIGS. 16-19 illustrate in detail the tab orientation apparatus 52. It includes a support stand 155 which carries a lower horizontal plate 156 and an upper horizontal plate 157 spaced apart and secured by spacer block 159. The lower plate supports an actuator arm 160 from which depends a generally cylindrical block 161, this block projecting downwardly through an aperture 162 in the lower support plate 156. Block 161 carries a pair of flat divergent finger elements 164 formed of spring steel. These finger elements form a tweezer-like combination which can be moved together to the position shown in FIG. 17.

Block 161 is grooved on opposite sides of its periphery to receive a pair of vertical rods 166, 167 which extend downwardly from a bearing block 170. Bearing block 170, in turn, is journaled in a low friction bearing 171 (FIG. 18) carried by piston 172 of air cylinder 173. Mounted at the lower end of the rods 166, 167 is a finger actuating element 174 comprising, basically, a block with a narrow slot having a transverse dimension corresponding approximately to the combined thickness of the two finger elements 164. It will thus be understood that when air cylinder 173 is actuated, its cylinder 172 moves downwardly. This, in turn, moves the vertical rods 166, 167 downwardly to effect a downward stroke of the slotted finger operating element 174. This moves the two finger elements 164 of the tweezer combination together as illustrated in FIG. 17.

Figure 16:
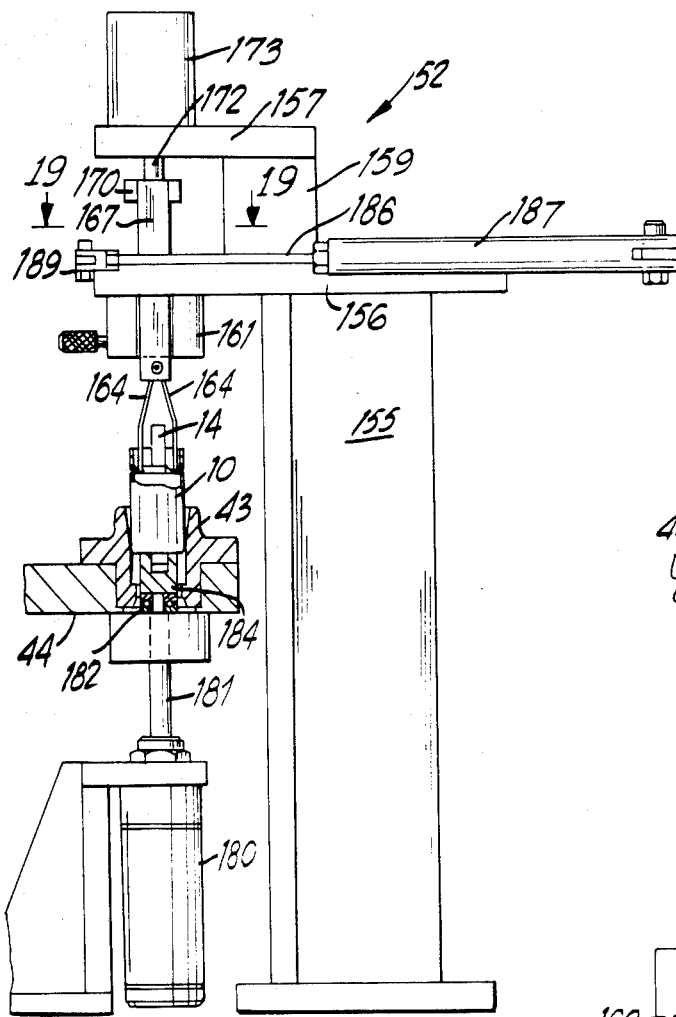
FIG. 16 is an elevation view in partial cross-section along the line 11—11 in FIG. 3, showing the apparatus for orienting the cell connector tabs prior to welding.
Figure 17:
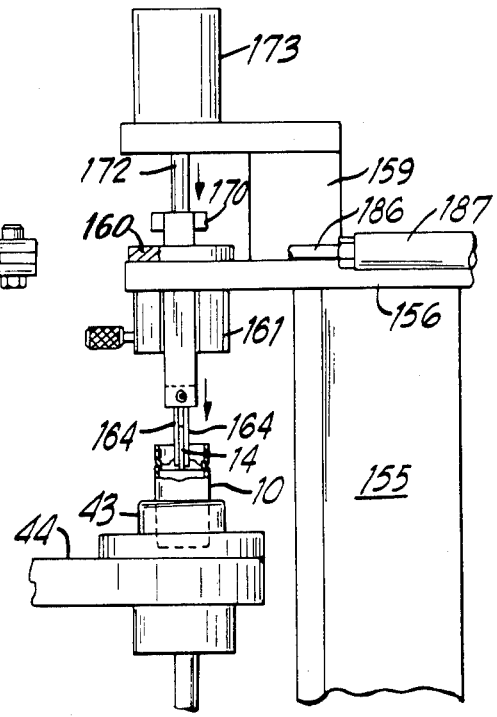
FIG. 17 is a partial elevation view similar to FIG. 16, illustrating a portion of the tab orienting apparatus.

Referring to FIGS. 16 and 17, it will be seen that the vertical motion axis of the tab orientation apparatus 52 is aligned coaxially with a nest 43 of the indexing table 44. This is the nest at station #10 of the indexing sequence. When the cell is properly positioned for engagement by the fingers 164, a closing of the fingers serves to rotate the entire casing as the fingers engage the flat upstanding tab 14. In FIG. 16, the finger elements 164 are shown in the open position prior to engagement of the tab 14. In FIG. 17, the finger elements are shown to be in the fully closed position, the tab 14 and cell casing 10 having been rotated to a position such that the tab element is between and parallel to the closed finger elements 164.

It was discovered that in order to achieve consistent reliable orientation of the cell casing, a low-friction supporting surface should be provided for the cell casing. To that end, the apparatus includes an air cylinder 180 disposed underneath the indexing table so that its piston 181, when actuated, moves upwardly into the aperture through the bottom of nest 43. The end of the piston 181 terminates in a ball bearing 182 to which is affixed a magnetic end member 184. The magnetic tip 184 secures the cell by magnetic force and stabilizes the casing when it is being lowered into the nest 43 upon retraction of the air cylinder piston 181. Ball bearing 182 provides a swivel journal of low friction, thus enabling the cell to be rotationally turned with the application of very low forces to the upstanding tab 14. The outwardly flared walls of the nest 43 also serve to eliminate friction with the cell casing 10.

In operation, when the indexing table 44 is in the dwell period, the air cylinder 180 is actuated to extend its piston 181 and move the cell casing 10 upwardly into a position for engagement by the finger elements 164. Once the piston 181 has been fully extended, the air cylinder 173 of the tab orientation apparatus is energized, thereby moving the rods 166, 167 and finger actuating block 174 downwardly to close the fingers. As these fingers 164 close, they engage the tab 14, thus rotating the cell casing until the tab 14 is parallel to the fingers 164. The air cylinder actuator 173 is now deactuated to move the rods 166, 167 and finger actuating element 174 upwardly, permitting the fingers 164 to spring open. The cell-elevating actuator 180 is now deactivated, lowering piston 181 and permitting the cell casing to descend fully into its rest position within nest 43.

By virtue of providing a low friction swivel support for cell casing 10 during tab orientation, the cell can be rotationally oriented by the exertion of very small forces to the somewhat fragile connector tab 14. Nevertheless, should the tab 14 be oriented substantially perpendicularly to the plane of fingers 164, it will be seen that fingers 164 could be prevented from closing or, alternatively, that the tab 14 would be crushed, since the forces exerted by fingers 164 are, in that case, acting generally parallel to the edges of the tab 14.

To preclude the eventuality of damage arising from this situation, the angular orientation of the tab prior to operation of the tab orientation apparatus 52 is sensed by a photoelectric detector located, for example, at position #9 of the indexing table. This detector (not shown) is arranged to develop an electrical signal when the angle formed between the plane of the tab and a reference plane exceeds a predetermined reference angle. Such a signal may be generated, for example, by projecting a beam of light at the general location of the upstanding tab at station #9 of the indexing table so that, when the angle of the tab exceeds the reference angle the light beam is interrupted. A photodetector responds to the interrupted light to generate an electrical signal. This signal is fed to the controller so that a command signal will be generated at the proper instant of time to reorient the finger elements 164 prior to their closing.

Figure 18:
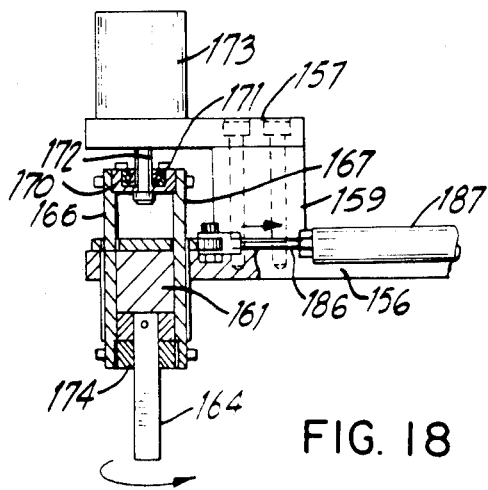
FIG. 18 is an elevation view similar to FIG. 16 showing the upper portion of the tab orienting apparatus in cross-section.

The command signal causes the piston 186 of the air cylinder actuator 187 to retract and thereby move from its normal position (FIGS. 16 and 19) to its retracted position (FIG. 18). Actuator piston 186 is connected at its free end by a pivot 189 to the lever portion 160a of the actuator arm 160. Movement of lever 160a acts against rods 166, 167 to cause the entire finger-closing mechanism to rotate at its point of supporting bearing 171, about the axis of air cylinder piston 172. Thus, support block 161, together with rods 166, 167 and finger closing element 174 all rotate 90 degrees to reorient the finger elements 164 by 90 degrees. In the rotationally reoriented position, the angle between the plane of the tab and the planes of fingers 164 is reduced to a very small angle, thus permitting the finger elements 164 to close without impediment or damage to the tab 14. With the fingers maintained in the closed position, air cylinder 187 is operated to return its piston 186 and actuator arm 160 to the normal positions. This returns the finger elements 164 to their rotationally normal position before the air cylinder 173 is deactuated to retract its piston and the elements attached to it so as to open the finger elements and release the tab 14. The fingers are maintained in this reoriented position while the air cylinder 173 is deactuated to open the finger elements 164. Thereafter, the cell casing is lowered into its nest so that the tab is clear of finger elements 164. Air cylinder 187 is then operated to return its piston 186 and actuator arm 160 to the normal positions, this being done prior to indexing the horizontal table to the next position.

Figure 19:
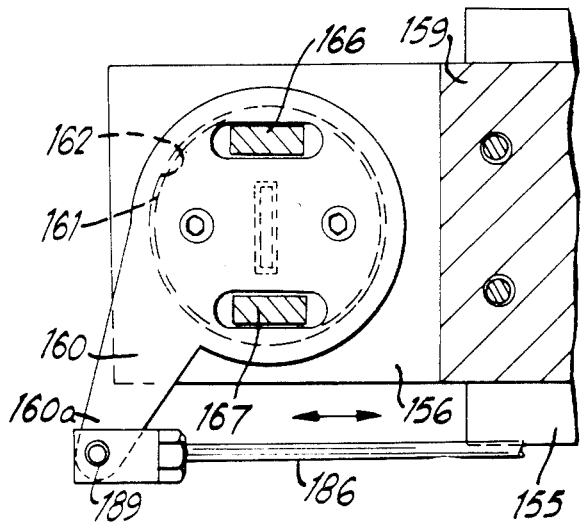
FIG. 19 is a cross-sectional view along the line 19—19 in FIG. 16.

In review, the tab orientation apparatus operates in the normal mode, with the air cylinder actuator 187 in the position shown in FIGS. 16, 17 and 19. As long as the angle formed between the plane of tab 14 and the reference plane does not exceed a predetermined reference angle, the air cylinder actuator remains in the normal position. In practice, the reference angle will be about 75 degrees–80 degrees, measured relative to a plane parallel to the plane of finger elements 164. If the reference angle is exceeded by the tab, the air cylinder actuator 187 is activated prior to closing of the fingers 164 and is then returned to its normal position prior to opening of the fingers and lowering the cell casing to its rest position in nest 43.

Cover Folding Apparatus

FIG. 20 is a front elevation view of the cover folding apparatus (designated by the numeral 60 in FIG. 3). This apparatus is situated at station #15 of the horizontal rotary index table 44. By virtue of cell casing orientation by tab orienting apparatus 52, cells reaching station #15 are situated such that the tab 14 and cover 15 line a plane generally parallel to the radius of indexing table 44.

The cover folding apparatus generally comprises a vertical support frame 190 carrying an actuator 191 which, when energized, causes output shaft 192 to rotate about its axis. Affixed to the end of this shaft is a cover engaging member 193 having a lever portion 194 adjacent the shaft 192 and a cover-engaging arm portion 195. Actuator 191 comprises an electric motor (not shown) whose output is connected to a gear box (not shown) which converts the motor output into rotation of shaft 192. Actuator 191 is a double acting device such that, when energized, it causes the cover folding member 193 to move from the normal position shown in FIG. 20 to a full-travel position 90 rotational degrees from normal.

The cover engaging portion 195 of the rotatable member 193 has a machined surface 199 conforming generally to the geometry of the cover 15. As best seen in FIG. 22, surface 199 is partially bounded by a circular lip 200 that is engageable by the rim of the insulator disk 28 associated with the cell cover 15. A portion of the surface 199 is notched away at 201 so as to permit the upstanding cover 15 to pass underneath the cover engaging member 193 into its indexed stationary position. The location of the cell in this indexed position relative to the cover engaging member 193 is best seen in FIG. 21. The cover 15 is somewhat off-axis of the cell casing 10 and, to be folded, must be moved both rotationally and downwardly into the open top of the casing.

When member 193 is pivoted about ten degrees, as shown in FIG. 21, the surface 199 engages the top edge of the rim of insulator disk 28. Thereafter, as the member 193 continues to rotate in a clockwise direction, the insulator disk 28 is pivotally cammed by its engagement with the surface 199 and is thus pivoted and simultaneously moved downwardly as the member 193 pivots. When the member 193 is rotated approximately 45–50 degrees, as shown in FIG. 22, the rim of insulator disk 28 engages the lip 200, and the cover assembly is thus firmly seated in the cover engaging portion 195. Thereafter, the cover assembly follows an arcuate path such that the center of the cover assembly is alligned with the pivotal arc of rotation passing through the axis of cell casing 10. Thus the cover will be coaxial with the axis of cell 10 when the cover engaging member 193 has rotated a full ninety degrees. At this point, the cover assembly is seated in the open end of the cell, substantially in the position as shown in the cross-sectional view of FIG. 2.

It will be observed that the cover engaging member 193 is so constructed that its surfaces do not touch, scrape or otherwise interfere with the sealant coating 202 (illustrated by the shaded area in the figures). It will also be appreciated that the pivotal member 193 engages the cover assembly in a manner such that the cover assembly first begins a rotational motion to initiate bending of the flexible tab 14 prior to any downward motion of the cover assembly. This insures a correct bowing and folding of the tab 14 as the entire cover assembly is moved toward the open end of the casing.

Once the cover engaging member 193 has been fully actuated to a substantially horizontal position, the actuator motor 197 is reversed, returning the member 193 to the vertical position of FIG. 20.

The cell assembly apparatus described above has been found to enhance the efficiency of manufacturing rechargeable electrochemical cells. This efficiency encompasses a higher manufacturing rate, a minimized requirement for manual assembly steps, better cell performance due in part to reduced variability in component quality, a higher quality rate with fewer defective cells being produced, and the ability to monitor individual cells as they progress through the manufacturing process.

Although the invention has been described with reference to a preferred embodiment, it will be appreciated that many modifications and variations may be made by those skilled in the art without departing from the scope and spirit of the invention. For example, pneumatic devices are used in many cases throughout the apparatus described herein to effect the mechanical movement of the cells or machine components; however, electric actuators can certainly be used for the same purposes. Additionally, different sensing devices can be used throughout the apparatus. Thus, in place of photoelectric sensors, mechanical sensors may be practicably used. As another example, the means for rotating spindles on the vertical dial can be adapted to other drive means. Instead of a belt drive, for example, gear drives might be used. Similarly, other cover loading mechanisms are foreseeable. Accordingly, except as otherwise expressly precluded by the claims, all such modifications and variations should be considered embraced by the invention.

What we claim is:

1. In apparatus for automatically assembling the components of electrochemical cells on a production line basis, wherein such cells each include a cell casing, an electrode assembly contained in the casing and an electrical conductor tab connected between the electrode assembly and a cover member which closes the cell and forms an electrical terminal therefor, the combination of:
   cell indexing means having a plurality of locations for retaining and transporting cells through a plurality of operative stations, said plurality of stations including a loading station for loading the cells, an intermediate welding station for performing a welding operation and an ejection station for ejecting the cells, the casings each containing an electrode assembly having a conductor tab extending therefrom toward the open end of the cell casing;
   cover assembly indexing means for receiving and transporting a plurality of cover assemblies from a loading location associated with said cover assembly indexing means to a welding location associated with the welding station in synchronism with said cell indexing means, said cover assembly indexing means being so located and operative to position a cover assembly at each cell casing reaching the welding location, the positioned cover assembly being aligned with the conductor tab associated with the cell casing at said welding station; and
   welding means associated with the welding station for mechanically and electrically connecting said conductor tab to said cover assembly at said welding station.

2. The automatic cell assembly apparatus of claim 1, wherein each of the indexing means has rotary motion and the cell components carried thereby follow an arcuate path.

3. The automatic cell assembly apparatus of claim 1, wherein:
   said cell and cover assembly indexing means have a rotary motion about axes that are substantially mutually perpendicular.

4. The automatic cell assembly apparatus of claim 3, wherein:
   said rotary cell indexing means transports the cells in a horizontal plane and said rotary cover assembly indexing means transports cover assemblies in a vertical plane.

5. The automatic cell assembly apparatus of claim 1, wherein said cover assembly indexing means comprises a plurality of cover-assembly retaining means movable cyclically therewith through the loading location and a welding location, the apparatus further comprising:
   means for advancing cover assemblies seriatim into a position aligned with the retaining means at the loading location;
   means for moving said cover assembly into contact with said retaining means while said cover assembly and aligned retaining means are stationary.

6. The automatic cell assembly apparatus of claim 5, wherein:
   each of said cover assembly retaining means includes a suction head for receiving a cover assembly in substantially sealing relationship thereto, the cover assembly indexing means including means for applying suction to each said suction head so as to releasably retain the cover assemblies for transport from the loading location to the welding location.

7. The automatic cell assembly apparatus of claim 5, wherein each of said cover assembly retaining means comprises a rotatable spindle for receiving a cover assembly for rotation thereof about the spindle axis, the apparatus further comprising:
   sealant applicator means disposed downstream of the loading location and adjacent the path of travel of said spindles for dispensing a liquid sealant material for sealing the interface formed when said cell casing and said cover assembly are joined,
   the spindle adjacent said applicator means permitting rotation of the cover assemblies retained therein in contact with the sealant material, thereby to coat the edge surface of said cover assemblies therewith.

8. The automatic cell assembly apparatus of claim 7, further comprising:
   means for rotating said spindle retaining the cover assembly to which sealant material is applied.

9. The automatic cell assembly apparatus of claim 8, wherein said spindle rotating means causes the spindles at a selected indexing location downstream of said sealant applicator means to rotate, whereby the cover assembly retained by said downstream spindle rotates to assist in the distribution of sealant material over the coated surface of the cover assembly.

10. The automatic cell assembly apparatus of claim 7, wherein each of said spindles has a drive member associated therewith, the spindle rotating means including drive means engageable by the drive member of the spindle at selected indexing locations.

11. The automatic cell assembly apparatus of claim 9, wherein the drive means for rotating the spindle comprises an endless belt tangentially engageable by the drive means of the spindle.

12. The automatic cell assembly apparatus of claim 1, wherein the cell casings are transported in a plane such that the cover assembly and connector tab to be welded thereto are mutually displaced at the welding station, the apparatus further comprising:
   means operative while said cell casing and cover assembly indexing means are stationary for moving said cell casing in a direction to bring the connector tab associated therewith into registration with the cover assembly for welding.

13. The automatic cell assembly apparatus of claim 12, wherein each cell casing is carried upstanding in a nest conforming to the cell casing geometry, the nest having an aperture extending therethrough, the cell casing moving means comprising an actuator extendable through said aperture to engage the bottom of the casing and to move such casing axially in said nest toward the cover assembly to be welded.

14. The apparatus of claim 13, further comprising:
magnetic means movable with said actuator and engageable of said casing during movement thereof.

15. The automatic cell assembly apparatus of claim 1, further comprising:
tab orientation means located at an operative station preceding said welding station, said tab orientation means being operative to engage and rotationally orient said cell casing so that the connector tab associated therewith has a predetermined geometric orientation relative to the cover assembly to be connected thereto.

16. The automatic cell assembly apparatus of claim 15, wherein the tab orientation means comprises:
a pair of flat parallel finger elements controllably movable between an open position free of the connector tab and a closed position wherein said finger elements engage and move the connector tab therebetween to an orientation parallel thereto.

17. The automatic cell assembly apparatus of claim 16, further comprising:
means for sensing any angular orientation of the connector tab in excess of a reference angle;
means responsive to the sensing means for rotating the parallel finger elements from a normal position to a shifted position so as to reduce the angle of orientation of the tab relative to said reference angle prior to closing of the finger elements, and for returning the finger elements to their normal position prior to the opening thereof.

18. The automatic cell assembly apparatus of claim 16, further comprising:
means for supporting said cell casing on a low friction rotatable surface during engagement of the connector tab by said finger elements.

19. The apparatus of claim 18, wherein said support means is movable between a normal position, wherein said cell is retained by the cell indexing means, and an extended position wherein said cell is moved so as to bring the tab associated therewith into registration with the cover assembly to be welded thereto.

20. The automatic cell assembly apparatus of claim 1, further comprising:
cover folding means located at an operative station downstream of the welding station of the cell casing indexing means, said cover folding means being controllably operable to engage the cover assembly welded to the connector tab and to translationally move and rotate such cover member into the open end of the cell casing while said casing is stationary.

21. The apparatus of claim 20, wherein said cover folding means comprises:
a cover engaging member controllably pivotable between a rest position free of the cover assembly and a second position over the open end of the cell casing, said cover engaging member having a cover-engaging camming surface for engaging an upper rim portion of the cover assembly and thereafter to rotate the cover assembly relative to the cell axis and to deform the tab attached thereto as the cover engaging member pivots toward the open end of the cell casing.

22. The apparatus of claim 21, wherein said cover engaging member comprises a lip portion bounding the camming surface and engageable by said upper rim portion of the cover assembly so as to seat the cover assembly on the camming surface with the center of the cover assembly aligned with the pivotal arc of rotation passing through the axis of the cell.

23. Apparatus according to claim 1, wherein the welding means comprises:
a welding head having at least one welding electrode;
means for controllably positioning said welding head for welding of the tab to the cover assembly; and
means associated with said welding head for effecting a resilient coupling between said welding electrode and said actuating means along the direction of movement of the welding electrode toward the cover assembly.

24. Apparatus according to claim 1, wherein the welding means comprises:
a welding head having at least one welding electrode; and
means for controllably positioning said welding head for welding of the tab to the cover assembly, said positioning means including an actuator having a piston movable axially toward and away from the welding location, and camming means engageable with said piston during axial movement thereof for rotating the welding head about the axis of the piston from a first position, wherein the welding head is free of the path of travel of cells in the cell casing indexing means, and the welding position.

25. In a system for performing manufacturing operations on electrochemical cells having a cell casing, including a member extending longitudinally therefrom, casing orientation apparatus, comprising:
means for retaining a cell casing to be oriented; and
cell member engaging means having a predetermined position relative to the cell retaining means, including a pair of generally parallel finger elements controllably movable from an open position free of the cell member to a closed position wherein the finger elements engage and rotate the cell member therebetween to an orientation parallel thereto;
said cell member engaging means further comprising means for supporting said finger elements at one end thereof, so that their free ends are divergent relative to each other,
a finger element closing member having a slot slidably receiving said finger elements, and means for moving said finger element closing means toward the divergent free ends of the finger elements, and thereby to move them together so as to engage the cell member.

26. In a system for performing manufacturing operations on electrochemical cells having a cell casing, including a member extending longitudinally therefrom, casing orientation apparatus, comprising:
means for retaining a cell casing to be oriented;
cell member engaging means having a predetermined position relative to the cell retaining means, including a pair of finger elements controllably movable from an open position free of the cell member to a closed position wherein closure of the finger elements causes them to engage and rotate the cell member therebetween to an orientation parallel thereto;

means for sensing a predetermined rotational orientation of the cell member; and means responsive to the sensing means for selectively rotating the cell member engaging means, when the cell member has said predetermined rotational orientation, so as to rotationally reorient said finger elements relative to the cell member prior to movement thereof to the closed position.

27. IIn a system for performing manufacturing operations on electrochemical cells having a cell casing, including a member extending longitudinally therefrom, casing orientation apparatus, comprising:

swivel support means for rotationally retaining a cell casing to be oriented, including a supporting surface for the cell journaled in low friction bearing means;

cell member engaging means, having a predetermined position relative to the cell retaining means, including a pair of finger elements controllably movable from an open position, wherein the finger elements are nonparallel to and free of the cell member. to a closed position, wherein closure of the finger elements causes them to engage and rotate the cell member therebetween to an orientation parallel thereto without rotational movement of the cell member engaging means; and means for axially moving the cell casing from a first position free of said finger elements to a second position longitudinally aligned with said finger elements so as to be engageable thereby.

28. In apparatus for automatically assembling the components of electrochemical cells on a production line basis, wherein such cells each include a cell casing, an electrode assembly contained in the casing and electrically connected to a cover member which closes the cell and forms an electrical terminal therefor, the combination of:

cell indexing means having a plurality of locations for retaining and transporting cells through a plurality of operative stations, said plurality of stations including a loading station for loading the cells, an intermediate welding station for performing a welding operation and an ejection station for ejecting the cells, the casings each containing an electrode assembly accessible from an open end of the casing;

cover member placement means for receiving and transporting a plurality of cover members from a loading location associated with said cover member placement means to a welding location associated with said welding station in timed relation with said cell indexing means, said cover member placement means being so located and operative to position a cover member at each cell casing reaching the welding location, the positioned cover member being so disposed relative to the electrode assembly as to permit electrical contact between the electrode assembly and the cover member; and welding means associated with the welding station for mechanically and electrically connecting said electrode assembly to said cover member at said welding station.

29. The apparatus of claim 28, wherein said cover member placement means comprises:

cover member indexing means for receiving and transporting a plurality of cover members between a loading position and an unloading position; and intermediate transfer means for transferring each said cover member from the unloading position of said cover indexing means to the welding location, said intermediate transfer means operating in timed sequence to said cover indexing and welding means.

30. The apparatus of claims 29, wherein said intermediate transfer means includes:

weld support means for releasably holding a cover member transferred thereto; and pick-and-place means for removing each cover member from the cover assembly indexing means and transferring it from the unloading position to the weld support means;

said weld support means being controllably movable from a cover member receiving position free of the cell indexing means to a welding position for holding said cover assembly in position for welding.

31. The apparatus of claim 30 wherein;

said weld support means is conductive of welding current, the apparatus further comprising;

circuit means coupled to said weld support means for completing a circuit for welding current applied to said cover assembly.

32. Apparatus according to claim 30, further including:

first means responsive to the presence of a cover member at the unloading location;

second means responsive to the absence of a cover member at said weld support means when in the cover member receiving position; and means jointly responsive to said first and second means for causing said pick-and-place means to operate.

33. In apparatus for automatically assembling components of electrochemical cells on a production line basis, wherein such cells include an electrode assembly connected to a cover member which forms an electrical terminal for the cell, automatic welding apparatus comprising:

cell indexing means for transporting cells seriatim to a welding station;

cover member indexing means for receiving and transporting a plurality of cover members between a loading location and an unloading location;

cover transfer means for removing each cover member from the cover member indexing means and transferring it from said unloading location and from a welding position, said cover transfer means including a weld support for holding the cover member adjacent the electrode assembly during welding and being operable in timed sequence with said cover member indexing means and said cell indexing means so as to position a cover member at the welding position while said cell indexing means is stationary.

34. The apparatus of claim 33, further comprising:

welding head means controllably positionable, in timed relation with said cell indexing means, between an inactive position free of the cell indexing means, and a welding position for applying weld current to the adjacent electrode assembly and cover member.

35. The apparatus of claim 33, further comprising:

a welding circuit including said weld support means for receiving welding current from the cover member held thereby during welding.

36. In apparatus for automatically assembling the components of electrochemical cells on a production line basis, wherein such cells include a cell casing and a cell cover member forming an electrical terminal therefor, the cover member being insulated from the cell casing by an insulator therebetween, cover assembly apparatus comprising:

cover member indexing means having a plurality of retaining means for releasably supporting and transporting a respective plurality of cover members from a loading location to an unloading location;

cover member loading means including a supply of cover members and means for placing individual ones thereof on respective retaining means in timed relation to movement of said indexing means, said cover members being retained on said retaining means so as to have at least one face thereof exposed; and insulator loading means at a second location downstream of said cover member loading means, said insulator loading means including a supply of insulators and means operable in timed relation to said indexing means for placing individual ones of said insulators over respective cover assemblies arriving at the downstream location, said insulators thereafter being retained on the cover members as they are transported to the unloading location.

37. In a system for performing manufacturing operations on electrochemical cells having a cell casing, including a member extending longitudinally therefrom, casing orientation apparatus, comprising:

means for retaining a cell casing to be oriented;

cell member engaging means having a predetermined position relative to the cell retaining means including a pair of parallel finger elements controllably movable from an open position free of the cell member to a closed position wherein closure of the finger elements causes them to engage and rotate the cell member therebetween to an orientation parallel thereto;

means for sensing a predetermined rotational orientation of the cell member; and means responsive to the sensing means for selectively rotating the cell member engaging means, when the cell member has said predetermined rotational orientation so as to rotationally reorient said finger elements relative to the cell member prior to movement thereof to the closed position.

* * * * *